(12) United States Patent
Park et al.

(10) Patent No.: US 10,547,099 B2
(45) Date of Patent: Jan. 28, 2020

(54) ANTENNA STRUCTURE AND ELECTRONIC DEVICE INCLUDING THE SAME

(71) Applicant: Samsung Electronics Co., Ltd., Gyeonggi-do (KR)

(72) Inventors: Gyu Bok Park, Gyeonggi-do (KR); Kyung Moon Seol, Gyeonggi-do (KR); Ji Ho Kim, Gyeonggi-do (KR); Kyi Hyun Jang, Seoul (KR); Hyun Seock Roh, Gyeonggi-do (KR); Sang Bong Sung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 185 days.

(21) Appl. No.: 15/285,068

(22) Filed: Oct. 4, 2016

(65) Prior Publication Data

US 2017/0125887 A1 May 4, 2017

(30) Foreign Application Priority Data

Nov. 2, 2015 (KR) ........................ 10-2015-0153407

(51) Int. Cl.
*H01Q 1/24* (2006.01)
*H01Q 5/321* (2015.01)
(Continued)

(52) U.S. Cl.
CPC ............ *H01Q 1/243* (2013.01); *H01Q 5/314* (2015.01); *H01Q 5/321* (2015.01); *H01Q 5/335* (2015.01);
(Continued)

(58) Field of Classification Search
CPC ............ H01Q 1/243; H01Q 1/28; H01Q 5/35; H01Q 5/335; H01Q 5/321; H01Q 9/42;
(Continued)

(56) References Cited

U.S. PATENT DOCUMENTS

| 7,469,131 | B2 | 12/2008 | Nail et al. |
| 7,688,273 | B2 | 3/2010 | Montgomery et al. |

(Continued)

FOREIGN PATENT DOCUMENTS

| CN | 102437427 | 5/2012 |
| CN | 102623806 | 8/2012 |

(Continued)

OTHER PUBLICATIONS

International Search Report dated Jan. 6, 2017 issued in counterpart application No. PCT/KR2016/010776, 12 pages.

(Continued)

*Primary Examiner* — Hoang V Nguyen
*Assistant Examiner* — Awat M Salih
(74) *Attorney, Agent, or Firm* — The Farrell Law Firm, P.C.

(57) ABSTRACT

An antenna structure is provided for use in an electronic device. The antenna structure includes a first feeding part; a second feeding part; and an antenna radiator including a first connection pattern including a first end and a second end, the first end of the first connection pattern being electrically connected to the first feeding part; a second connection pattern including a first end and a second end, the first end of the second connection pattern being electrically connected to the second feeding part; a first pattern that connects the second end of the first connection pattern and the second end of the second connection pattern; and a second pattern that extends from at least one end of the first pattern. The first feeding part is configured to transmit or receive a signal of a first frequency band, and the second feeding part is configured to transmit or receive a signal of a second frequency band that at least partially overlaps the first frequency band.

18 Claims, 18 Drawing Sheets

(51) Int. Cl.
  *H01Q 9/42* (2006.01)
  *H01Q 21/28* (2006.01)
  *H01Q 5/35* (2015.01)
  *H01Q 5/335* (2015.01)
  *H01Q 5/314* (2015.01)
  *H04B 7/0413* (2017.01)
  *H01Q 5/378* (2015.01)

(52) U.S. Cl.
  CPC ................ *H01Q 5/35* (2015.01); *H01Q 9/42* (2013.01); *H01Q 21/28* (2013.01); *H04B 7/0413* (2013.01); *H01Q 5/378* (2015.01)

(58) Field of Classification Search
  CPC ........ H01Q 21/28; H01Q 5/314; H01Q 5/378; H04B 7/0413
  See application file for complete search history.

(56) References Cited

U.S. PATENT DOCUMENTS

| | | |
|---|---|---|
| 7,831,230 B2 | 11/2010 | Nail et al. |
| 8,164,538 B2 | 4/2012 | Montgomery et al. |
| 8,547,289 B2 | 10/2013 | Montgomery et al. |
| 8,600,462 B2 | 12/2013 | Kato |
| 8,654,013 B2 | 2/2014 | Watanabe et al. |
| 8,780,002 B2 | 7/2014 | Hakansson et al. |
| 8,798,554 B2 | 8/2014 | Darnell et al. |
| 8,803,756 B2 | 8/2014 | Montgomery et al. |
| 8,866,691 B2 | 10/2014 | Montgomery et al. |
| 8,937,578 B2 | 1/2015 | Montgomery |
| 9,001,000 B2 | 4/2015 | Satou et al. |
| 9,088,073 B2 | 7/2015 | Leung et al. |
| 9,190,726 B2 | 11/2015 | Montgomery et al. |
| 9,318,803 B2 | 4/2016 | Montgomery et al. |
| 9,401,547 B2 | 7/2016 | Montgomery et al. |
| 9,444,150 B2 | 9/2016 | Hirobe et al. |
| 9,768,505 B2 | 9/2017 | Cho et al. |
| 2006/0057987 A1 | 3/2006 | Nail et al. |
| 2008/0278405 A1 | 11/2008 | Montgomery et al. |
| 2009/0111407 A1 | 4/2009 | Nail et al. |
| 2010/0265146 A1 | 10/2010 | Montgomery et al. |
| 2011/0050528 A1 | 3/2011 | Montgomery |
| 2011/0080332 A1 | 4/2011 | Montgomery et al. |
| 2011/0102268 A1 | 5/2011 | Watanabe et al. |
| 2012/0013519 A1 | 1/2012 | Hakansson et al. |
| 2012/0064954 A1 | 3/2012 | Kato |
| 2012/0299792 A1 | 11/2012 | Montgomery et al. |
| 2013/0057438 A1 | 3/2013 | Satou et al. |
| 2013/0069842 A1 | 3/2013 | Lee et al. |
| 2013/0162497 A1 | 6/2013 | Satou et al. |
| 2013/0203364 A1 | 8/2013 | Darnell et al. |
| 2013/0222186 A1 | 8/2013 | Leung et al. |
| 2013/0328742 A1 | 12/2013 | Hirobe et al. |
| 2014/0055319 A1 | 2/2014 | Cho et al. |
| 2014/0062819 A1 | 3/2014 | Montgomery et al. |
| 2014/0062820 A1* | 3/2014 | Jang ........................ H01Q 1/48 343/749 |
| 2014/0340269 A1 | 11/2014 | Montgomery et al. |
| 2014/0340274 A1 | 11/2014 | Montgomery et al. |
| 2015/0084824 A1 | 3/2015 | Montgomery |
| 2016/0043477 A1 | 2/2016 | Montgomery et al. |
| 2016/0190684 A1 | 6/2016 | Montgomery et al. |
| 2016/0204499 A1* | 7/2016 | Toh .......................... H01Q 1/24 343/702 |
| 2017/0047642 A1* | 2/2017 | Li ............................ H01Q 1/38 |

FOREIGN PATENT DOCUMENTS

| | | | |
|---|---|---|---|
| CN | 105409058 | * | 4/2014 |
| EP | 2 416 444 | | 2/2012 |
| WO | WO 2015/128856 | | 9/2015 |

OTHER PUBLICATIONS

European Search Report dated Sep. 10, 2018 issued in counterpart application No. 16862292.6-1205, 11 pages.
Chinese Office Action dated Mar. 29, 2019 issued in counterpart application No. 201680025367.6, 23 pages.

* cited by examiner

ANTENNA STRUCTURE AND ELECTRONIC DEVICE INCLUDING THE SAME

PRIORITY

This application claims priority under 35 U.S.C. § 119(a) to Korean Patent Application Serial number 10-2015-0153407, which was filed in the Korean Intellectual Property Office on Nov. 2, 2015, the entire disclosure of which is incorporated herein by reference.

BACKGROUND

1. Field of the Disclosure

The present disclosure relates generally to a multiple-input multiple-output (MIMO) technology for an antenna structure, and more particularly to an electronic device including the antenna structure.

2. Description of the Related Art

The advance of mobile communication and antenna technologies are accompanied by an increase of the number of antennas included in electronic devices. However, as electronic devices are generally small-sized, the available spaces for mounting the antennas is limited.

Further, because antennas are normally mounted in the limited interior spaces of the electronic devices, the antennas are often arranged very close to each other. Consequently, these neighboring antennas may interfere with each other, for example, when signals of adjacent frequencies are transmitted and received, thereby lowering of the performance of the antennas.

Additionally, when a housing of an electronic device is formed of a conductive material (for example, metal), the radiation performance of the antenna may also be affected.

SUMMARY

Accordingly, the present disclosure is made to address at least the above-mentioned problems and/or disadvantages and to provide at least the advantages described below.

An aspect of the present disclosure is to provide an antenna structure equipped with a plurality of feeders in one antenna radiator, and an electronic device including the antenna structure.

In accordance with an aspect of the present disclosure, an electronic device is provided, which includes a first communication port; a second communication port; an antenna that is electrically connected to the first communication port and the second communication port at a first feeding point and a second feeding point, respectively, wherein the antenna comprises a first connecting part including a first end and a second end, the first end of the first connecting part being electrically connected to the first feeding point; a second connecting part including a first end and second end, the first end of the second connecting part being electrically connected to the second feeding point; and a conductive pattern including a first portion that connects the second end of the first connecting part and the second end of the second connecting part, and a second portion that extends from at least one end of the first portion; a communication circuit that is electrically connected to the first communication port and the second communication port; and a processor that is electrically connected to the communication circuit. The processor controls the communication circuit to transmit or receive a signal of a first frequency band, through the first communication port; and transmit or receive a signal of a second frequency band that at least partially overlaps the first frequency band, through the second communication port.

In accordance with another aspect of the present disclosure, an antenna structure is provided, which includes a first feeding part; a second feeding part; and an antenna radiator including a first connection pattern including a first end and a second end, the first end of the first connection pattern being electrically connected to the first feeding part; a second connection pattern including a first end and a second end, the first end of the second connection pattern being electrically connected to the second feeding part; a first pattern that connects the second end of the first connection pattern and the second end of the second connection pattern; and a second pattern that extends from at least one end of the first pattern. The first feeding part is configured to transmit or receive a signal of a first frequency band, and the second feeding part is configured to transmit or receive a signal of a second frequency band that at least partially overlaps the first frequency band.

BRIEF DESCRIPTION OF THE DRAWINGS

The above and other aspects, features, and advantages of certain embodiments of this disclosure will be more apparent from the following description taken in conjunction with the accompanying drawings, in which.

DETAILED DESCRIPTION

Figure 1:
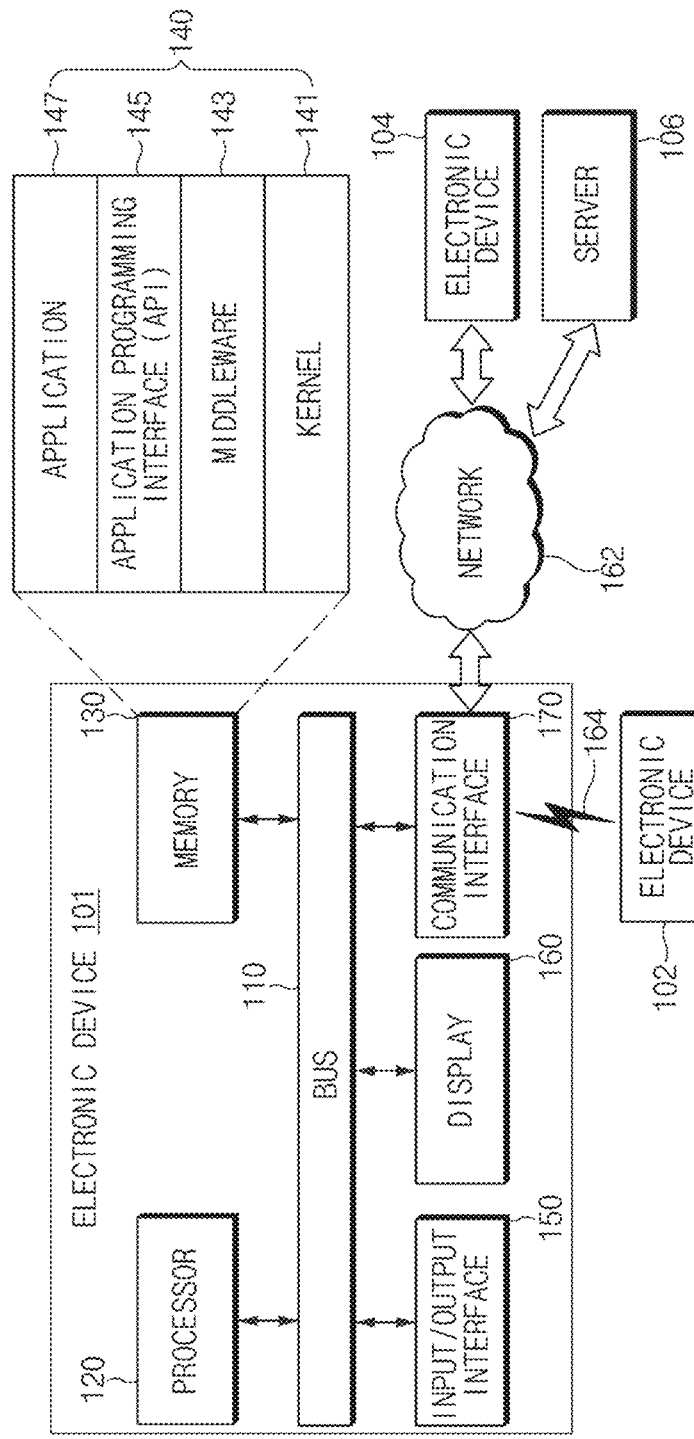
FIG. 1 illustrates an electronic device in a network environment according to an embodiment of the present disclosure.

Various embodiments of the present disclosure will be described below with reference to the accompanying drawings. Accordingly, those of ordinary skill in the art will recognize that modifications, equivalents, and/or alternatives of the various embodiments described herein can be made without departing from the scope and spirit of the present disclosure. With regard to the description of drawings, similar components may be marked by similar reference numerals.

Terms and expressions used in this disclosure are used to describe certain embodiments thereof and are not intended to limit the scope of the disclosure.

The terms of a singular form may include plural forms unless otherwise specified.

Unless otherwise defined herein, all the terms used herein, which include technical or scientific terms, may have the same meanings that are generally understood by a person skilled in the art. Terms, which are defined in a dictionary and commonly used, should also be interpreted as is customary in the relevant related art and not in an idealized or overly formal way, unless expressly defined as such herein. In some cases, even if terms are defined in the specification, they may still not be interpreted to exclude embodiments of the present disclosure.

The expressions "have", "may have", "include", "comprise", "may include", and "may comprise" indicate the existence of corresponding features (for example, elements such as numeric values, functions, operations, or components) but do not exclude presence of additional features.

The expressions "A or B", "at least one of A or/and B", "one or more of A or/and B", etc., may include any and all combinations of one or more of the associated listed items. For example, the expression "A or B", "at least one of A and B", or "at least one of A or B" may refer to (1) where at least one A is included, (2) where at least one B is included, or (3) where both of at least one A and at least one B are included.

The terms, such as "first", "second", etc., may be used to distinguish an element from another element but do not limit the order and/or priority of the elements. For example, a first user device and a second user device may represent different user devices, irrespective of sequence or importance. Accordingly, a first element may be referred to as a second element, and similarly, a second element may be referred to as a first element.

When an element (e.g., a first element) is referred to as being "(operatively or communicatively) coupled with/to" or "connected to" another element (e.g., a second element), the first element may be directly coupled with/to or connected to the second element or an intervening element (e.g., a third element) may be present therebetween. However, when the first element is referred to as being "directly coupled with/to" or "directly connected to" the second element, no intervening element may be present therebetween.

The expression "configured to" may be used interchangeably with, for example, "suitable for", "having the capacity to", "designed to", "adapted to", "made to", or "capable of".

The expression "configured to" does not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) that may perform corresponding operations by executing one or more software programs which are stored in a memory device.

An electronic device according to an embodiment of this disclosure may be a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), an MP3 player, a mobile medical device, a camera, and a wearable device. For example, the wearable device may include an accessories, such as a watch, a ring, a bracelet, an ankle bracelet, glasses, contact lenses, or a head-mounted device (HMD), a clothing-integrated device (e.g., electronic clothing), a body-attached device (e.g., a skin pad or a tattoo), and/or an implantable device (e.g., an implantable circuit).

The electronic device may also be a home appliance, such as a digital video disk (DVD) player, an audio receiver, a refrigerator, an air conditioner, a cleaner, an oven, a microwave oven, a washing machine, an air cleaner, a set-top box, a home automation control panel, a security control panel, a television (TV) box (e.g., Samsung HomeSync®, Apple TV®, or Google TV®), a game console (e.g., Xbox® or PlayStation®), an electronic dictionary, an electronic key, a camcorder, or an electronic panel.

The electronic device may also be a medical device, such as a portable medical measurement device (e.g., a blood glucose meter, a heart rate measuring device, a blood pressure measuring device, and a body temperature measuring device), a magnetic resonance angiography (MRA) device, a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, an electronic device for a vessel (e.g., a navigation device for vessels and/or a gyro compass), avionics, a security device, a vehicular head unit, an industrial or home robot, an automatic teller machine (ATM), a point of sales (POS) device, or an Internet of Things (IoT) device (e.g., a light bulb, a sensor, an electricity or gas meter, a sprinkler device, a fire alarm device, a thermostat, an electric pole, a toaster, a sporting apparatus, a hot water tank, a heater, and a boiler).

The electronic device may also be furniture or a part of a building/structure, an electronic board, an electronic signature receiving device, a projector, or a measurement device (e.g., a water service, electricity, gas, or electric wave measuring device).

The electronic device may be a flexible electronic device.

The electronic device may also be a combination of the aforementioned devices.

However, the electronic device is not limited to the aforementioned devices. For example, the electronic device may also include a new electronic device produced due to the development of technology.

Herein, the term "user" may refer to a person who uses an electronic device or may refer to a device (e.g., an artificial intelligence (AI) electronic device) that uses the electronic device.

FIG. 1 illustrates an electronic device in a network environment according to an embodiment of the present disclosure.

Referring to FIG. 1, electronic devices 101, 102, and 104 and/or a server 106 are connected to each other through a network 162 and/or a short range communication 164.

The electronic device 101 includes a bus 110, a processor 120, a memory 130, an input/output interface 150, a display 160, and a communication interface 170. Alternatively, the electronic device 101 may exclude at least one of the illustrated elements or may additionally include another element.

The bus 110 may include a circuit that connects the processor 120, the memory 130, the input/output interface 150, the display 160, and the communication interface 170 and transfers communications (e.g., control messages and/or data) there between.

The processor 120 may include one or more of a CPU, an application processor (AP), or a communication processor (CP). The processor 120 may execute operations or data processing related to the control and/or communication of at least one other element of the electronic device 101.

The memory 130 may include a volatile and/or nonvolatile memory. The memory 130 may store commands or data related to at least one other element of the electronic device 101. The memory 130 stores software and/or a program 140.

The program 140 includes a kernel 141, middleware 143, an application programming interface (API) 145, and application programs (or applications) 147. At least some of the kernel 141, the middleware 143, or the API 145 may be referred to as an operating system (OS).

The kernel 141 may control or manage system resources (e.g., the bus 110, the processor 120, and the memory 130) that are used to execute operations or functions implemented in the other programs (e.g., the middleware 143, the API 145, or the applications 147). The kernel 141 may provide an interface through which the middleware 143, the API 145, or the applications 147 access individual elements of the electronic device 101, e.g., to control or manage the system resources.

The middleware 143 may allow the API 145 or the applications 147 to communicate with the kernel 141 in order to exchange data.

The middleware 143 may process one or more work requests received from the applications 147, according to their priorities. For example, the middleware 143 may give a priority, by which a system resource (e.g., the bus 110, the processor 120, or the memory 130) of the electronic device 101 may be used, to at least one of the application programs 147. The middleware 143 may perform scheduling or load balancing for the one or more work requests by processing the one or more work requests according to the priority given to the at least one of the applications 147.

The API 145 is used by the application 147 to control a function provided by the kernel 141 or the middleware 143, and may include, for example, at least one interface or function (e.g., an instruction) for file control, window control, image processing, text control, etc.

The input/output interface 150 may transfer commands or data that are input from the user or another external device to another element of the electronic device 101. The input/output interface 150 may output commands or data received from another element of the electronic device to the user or to another external device.

The display 160 may include a liquid crystal display (LCD), a light emitting diode (LED) display, an organic light emitting diode (OLED) display, a microelectromechanical system (MEMS) display, or an electronic paper display. The display 160 may display various content (e.g., text, an image, a video, an icon, a symbol, etc.). The display 160 may include a touch screen, which receives a touch, a gesture, a proximity, and/or a hovering input using an electronic pen or the user's body.

The communication interface 170 may set communication between the electronic device 101 and the electronic device 102, the electronic device 104, and/or the server 106. For example, the communication interface 170 may be connected to a network 162 through a wireless communication or a wired communication to communicate with the external electronic device 104 or the server 106.

For example, the wireless communication may be a cellular communication protocol, such as long-term evolution (LTE), LTE-advanced (ATE-A), code division multiple access (CDMA), wideband CDMA (WCDMA), a universal mobile telecommunications system (UMTS), wireless broadband (WiBro), or a global system for mobile communications (GSM). Further, the wireless communication may include short range communication 164, such as wireless fidelity (Wi-Fi), Bluetooth, near field communication (NFC), magnetic stripe transmission (MST), GNSS, etc.

An MST may generate a pulse according to transmission data by using an electromagnetic signal. The pulse may generate a magnetic field signal. The electronic device 101 may transmit the magnetic field signal to a POS device, detect the magnetic field signal by using an MST reader, and/or restore the data by converting the detected magnetic signal into an electrical signal.

The GNSS may include at least one of a global positioning system (GPS), a global navigation satellite system (Glonass), a Beidou navigation satellite system (Beidou), or Galileo, the European global satellite-based navigation system, according to an in-use area or a bandwidth. Herein, "GPS" may be interchangeably used with the "GNSS".

The wired communication may include at least one of a universal serial bus (USB), a high definition multimedia interface (HDMI), recommended standard-232 (RS232), and a plain old telephone Service (POTS).

The network 162 may include at least one of communication networks, for example, a computer network (e.g., a local area network (LAN) or a wide area network (WAN)), the Internet, or a telephone network.

The electronic devices 102 and 104 may be the same type as or different types than the electronic device 101.

The server 106 may include a group of one or more servers.

All or some of the operations executed by the electronic device 101 may be executed by the electronic devices 102 and 104 and/or the server 106.

For example, when the electronic device 101 should execute some functions or services automatically or upon request, the electronic device 101 may request at least some functions associated with the functions or services from the electronic devices 102 and 104 and/or the server 106, in place of or in addition to directly executing the functions or services. The electronic device 102 or 104 and/or the server 106 may execute a requested function or an additional function, and may transfer the result to the electronic device 101. The electronic device 101 may process the received result directly or additionally, and may provide a requested function or service. For example, cloud computing, distributed computing, and/or client-server computing technologies may be used to share the workload between the electronic devices 101, 102, and 104 and/or the server 106.

Figure 2:
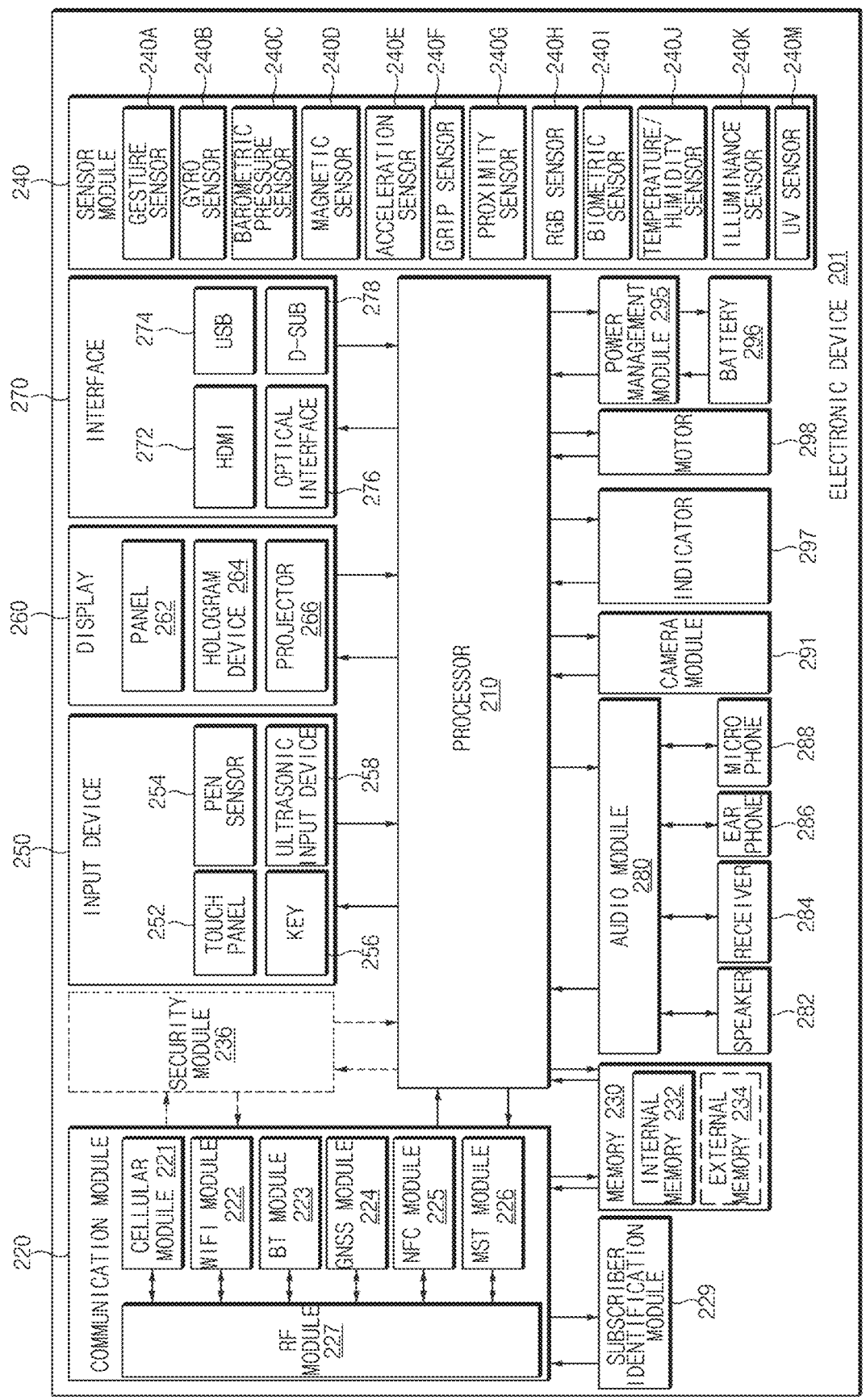
FIG. 2 illustrates an electronic device according to an embodiment of the present disclosure.

FIG. 2 illustrates an electronic device according to an embodiment of the present disclosure.

Referring to FIG. 2, an electronic device 201 includes a processor (e.g., an AP) 210, a communication module 220, a subscriber identification module (SIM) 229, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software elements connected to the processor 210 by driving an OS or an application program and perform a variety of data processing and calculations. The processor 210 may be implemented by a system on chip (SoC). The processor 210 may further include a graphical processing unit (GPU) and/or an image signal processor. The processor 210 may also include at least some of the other elements illustrated in FIG. 2 (e.g., a cellular module 221).

The processor 210 may load instructions or data, received from at least one other element (e.g., a non-volatile memory), in a volatile memory to process the loaded instructions or data, and may store various types of data in a non-volatile memory.

The communication module 220 includes a cellular module 221, a Wi-Fi module 222, a Bluetooth module 223, a GNSS module 224, an NFC module 225, and a radio frequency (RF) module 227.

The cellular module 221 may provide a voice call, a video call, a text message service, and/or an Internet service through a communication network. The cellular module 221 may distinguish between and authenticate electronic devices 201 within a communication network using the SIM 229.

The cellular module 221 may perform at least some of the functions that the processor 210 may provide. Accordingly, the cellular module 221 may include a CP.

Each of the Wi-Fi module 222, the Bluetooth module 223, the GNSS module 224, the NFC module 225, and the MST module 226 may include a processor for processing data transmitted/received through the corresponding module.

At least some (i.e., two or more) of the cellular module 221, the Wi-Fi module 222, the Bluetooth module 223, the GNSS module 224, and the MST module 226 may be included in one integrated chip (IC) or IC package.

The RF module 227 may transmit/receive a communication signal (e.g., an RF signal). The RF module 227 may include a transceiver, a power amp module (PAM), a frequency filter, a low noise amplifier (LNA), and/or an antenna.

At least one of the cellular module 221, the Wi-Fi module 222, the Bluetooth module 223, the GNSS module 224, the NFC module 225, and the MST module 226 may transmit or receive an RF signal through a separate RF module.

The SIM 229 may include a card including a subscriber identification module and/or an embedded SIM, and may further include unique identification information (e.g., an integrated circuit card identifier (ICCID)) or subscriber information (e.g., international mobile subscriber identity (IMSI)).

The memory 230 includes an internal memory 232 and an external memory 234.

The internal memory 232 may include at least one of a volatile memory (e.g., a dynamic random access memory (DRAM), a static RAM (SRAM), a synchronous dynamic RAM (SDRAM), etc.) and a non-volatile memory (e.g., a one-time programmable read only Memory (OTPROM), a programmable ROM (PROM), an erasable and programmable ROM (EPROM), an electrically erasable and programmable ROM (EEPROM), a flash memory (e.g., a NAND flash memory or a NOR flash memory), a hard driver, and a solid state drive (SSD).

The external memory 234 may include a flash drive, a compact flash (CF), a secure digital (SD), a micro secure digital (Micro-SD), a mini secure digital (Mini-SD), an extreme digital (xD), a memory stick, etc. The external memory 234 may be functionally and/or physically connected to the electronic device 201 through various interfaces.

The security module 236 includes a storage space having a relatively high security level as compared with the memory 230. For example, the security module 236 may be a circuit that provides a safe data storage and a protected execution environment. The security module 236 may be implemented by a separate circuit, and may include a separate processor. The security module 236 may be present in a detachable smart chip or an SD card, or may include an embedded secure element (eSE) embedded in a fixed chip of the electronic device 201. Further, the security module 236 may be driven by an OS that is different from the OS of the electronic device 201. For example, the security module 236 may be operated based on a java card open platform (JCOP)® OS.

The sensor module 240 may measure a physical quantity or detect an operation state of the electronic device 201, and may convert the measured or detected information to an electrical signal. The sensor module 240 includes a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red, green, and blue (RGB) sensor), a biometric sensor 240I, a temperature/humidity sensor 240J, an illumination sensor 240K, and a Ultra Violet (UV) sensor 240M.

Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor.

The sensor module 240 may further include a control circuit for controlling one or more sensors included therein.

The electronic device 201 may also include a processor configured to control the sensor module 240 as a part of or separately from the processor 210, and may control the sensor module 240 while the processor 210 is in a sleep state.

The input device 250 includes a touch panel 252, a (digital) pen sensor 254, a key 256, and an ultrasonic input device 258.

The touch panel 252 may use at least one of a capacitive type, a resistive type, an infrared type, and an ultrasonic type. The touch panel 252 may include a control circuit and a tactile layer, which provides a tactile reaction to a user.

The (digital) pen sensor 254 may include a recognition sheet that is a part of the touch panel or a separate recognition sheet.

The key 256 may include a physical button, an optical key, and/or a keypad.

The ultrasonic input device 258 may detect ultrasonic waves generated by an input tool through a microphone 288 and may identify data corresponding to the detected ultrasonic waves.

The display 260 includes a panel 262, a hologram device 264, and a projector 266.

The panel 262 may be flexible, transparent, and/or wearable. The panel 262 may also be formed as a single module together with the touch panel 252.

The hologram device 264 may show a three dimensional image in the air using an interference of light.

The projector 266 may display an image by projecting light onto a screen. The screen may be located in the interior of or on the exterior of the electronic device 201.

The display 260 may also include a control circuit for controlling the panel 262, the hologram device 264, and/or the projector 266.

The interface 270 includes a high-definition multimedia interface (HDMI) 272, a universal serial bus (USB) 274, an optical interface 276, and a D-subminiature (D-sub) 278. Additionally or alternatively, the interface 270 may include a mobile high-definition link (MHL) interface, a secure digital (SD) card/multimedia card (MMC) interface, and/or an infrared data association (IrDA) standard interface.

The audio module 280 may bilaterally convert a sound and an electrical signal. The audio module 280 may process voice information input or output through, for example, a speaker 282, a receiver 284, earphones 286, and/or the microphone 288.

The camera module 291 may photograph a still image and/or a dynamic image. The camera module 291 may include one or more image sensors (e.g., a front sensor or a back sensor), a lens, an image signal processor (ISP) or a flash (for example, an LED or xenon lamp).

The power management module 295 may manage power of the electronic device 201. The power management module 295 may include a power management IC (PMIC), a charger IC, and/or a battery gauge.

The PMIC may have a wired and/or wireless charging scheme. Examples of the wireless charging method may include, for example, a magnetic resonance method, a magnetic induction method, an electromagnetic wave method, etc.

Additional circuits (e.g., a coil loop, a resonance circuit, a rectifier, etc.) for wireless charging may be further included.

The battery gauge may measure a residual quantity of the battery 296, and a voltage, a current, or a temperature of the battery 296 while charging.

The battery 296 may include a rechargeable battery and/or a solar battery.

The indicator 297 may indicate particular status of the electronic device 201 or a part thereof (e.g., the processor 210), such as a booting status, a message status, a charging status, etc.

The motor 298 may convert an electrical signal into mechanical vibrations, and may generate a vibration or haptic effect.

Although not illustrated, the electronic device 201 may include a processing device (e.g., a GPU) for supporting mobile TV. The processing unit for supporting mobile TV may process media data according to a certain standard of digital multimedia broadcasting (DMB), digital video broadcasting (DVB), or media flow.

Each of the elements described in the specification may include one or more components, and the terms of the elements may be changed according to the type of the electronic device. In the various embodiments of this disclosure, an electronic device may include at least one of the elements described in the specification, and some elements may be omitted or additional elements may be further included. Some of the elements of the electronic device according to various embodiments of this disclosure may be coupled to form one entity, and may perform the same functions of the corresponding elements before they are coupled.

Figure 3A:
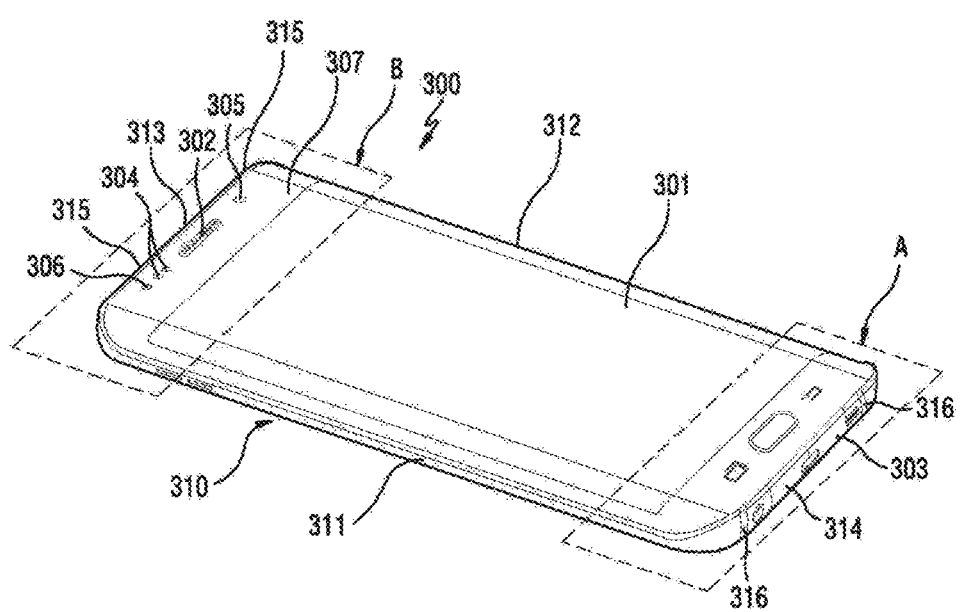
FIG. 3A illustrates a front perspective view of an electronic device according to an embodiment of the present disclosure.

FIG. 3A illustrates a front perspective view of an electronic device according to an embodiment of the present disclosure.

Referring to FIG. 3A, an electronic device 300 includes a display 301 installed on a front surface 307 thereof. A speaker unit 302 for receiving a voice of a counterpart is installed above the display 301. A microphone unit 303 for transmitting a voice of the user of the electronic device 300 to a counterpart is installed below the display 301.

Components, such sensor modules 304, for performing various functions of the electronic device 300 are arranged around the speaker unit 302. The sensor modules 304 may include at least one of an illumination sensor (e.g., a light sensor), a proximity sensor, an infrared ray sensor, and an ultrasonic wave sensor.

The components also include a front camera 305 and an LED indicator 306 for notifying the user of state information of the electronic device 300.

The electronic device 300 includes a metal member 310 that is arranged as at least an area of the metal housing or as a part of the interior of the metal housing. The metal member 310 is arranged along a periphery of the electronic device 300, and extends to at least a portion of a rear surface of the electronic device 300, which is connected to the periphery.

The metal member 310 may be defined by the thickness of the electronic device 300 along the periphery of the electronic device 300, and may have a form of a loop. However, this disclosure is not limited thereto, and the metal member 310 may contribute to at least a portion of the thickness of the electronic device 300.

Alternatively, the metal member 310 may be arranged only in portions of the periphery of the electronic device 300.

The metal member 310 includes partition parts 315 and 316. The unit conductive members that are partitioned by the partition parts 315 and 316 may be utilized as antenna radiators that are operated on one or more frequency bands.

When the electronic device 300 is viewed from the front side, the metal member 310 includes a left side metal member 311, a right side metal member 312, a top side metal member 313, and a bottom side metal member 314.

An antenna structure according to an embodiment of this disclosure may be arranged in a bottom area (area A) and a top area (area B) of the electronic device 300. The bottom side metal member 314, which is defined by a pair of the partition parts 316, may be used as an antenna radiator.

The top side metal member 313, which is defined by a pair of partition parts 315, may also be used as an antenna radiator.

The bottom side metal member 314 and the top side metal member 313 may contribute as antenna radiators that are operated at two or more operational frequency bands depending on an electrical length of radiators, due to a feeding location or a connection to an internal antenna radiator.

Alternatively, the antenna structure may be arranged in one of area A or area B of the electronic device 300, in which a performance of the antenna deteriorates least when the user grips the electronic device 300. However, this disclosure is not limited thereto, and the antenna structure may also be arranged on at least one of opposite side surfaces of the electronic device 300, except for area A or area B.

Figure 3B:
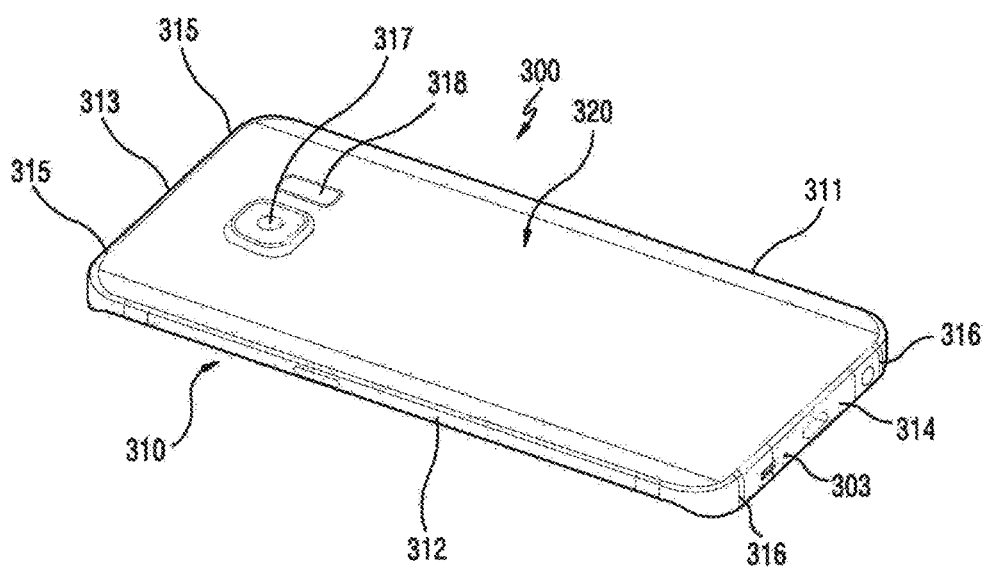
FIG. 3B is a rear perspective view of an electronic device according to an embodiment of the present disclosure.

FIG. 3B illustrates a rear perspective view of an electronic device according to an embodiment of the present disclosure.

Referring to FIG. 3B, a cover member 320 is installed on the rear surface of the electronic device 300. The cover member 320 may be a battery cover that protects a battery pack detachably installed in the electronic device 300 and making the external appearance of the electronic device 300 appealing. However, this disclosure is not limited thereto, and the cover member 320 may be integrally formed with the electronic device 300 to contribute as a rear housing of the electronic device 300.

The cover member 320 may be formed of various materials, such as metal, glass, a composite material, and/or a synthetic resin.

A rear camera 317 and a flash 318 are arranged on the rear surface of the electronic device 300.

When a battery pack is integrally applied to the interior of the electronic device 300, the cover member 320 may be replaced by the rear housing of the electronic device 300. In this case, at least an area of the rear housing constituting an external appearance of the electronic device 300 may be formed of a metallic material, and may contribute as an antenna member.

Figure 3C:
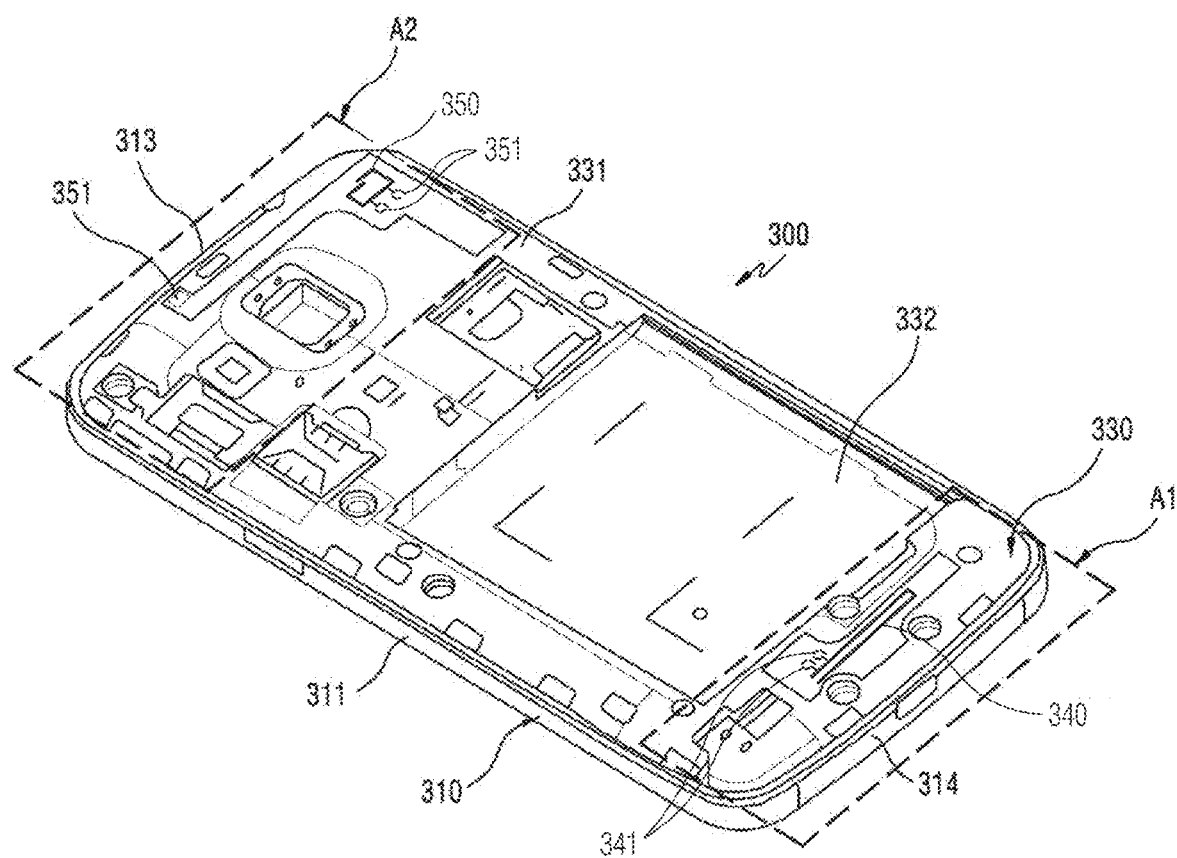
FIG. 3C is a rear perspective view of an electronic device on which an antenna structure is mounted according to an embodiment of the present disclosure.

FIG. 3C illustrates is a rear perspective view of an electronic device on which an antenna structure is mounted according to an embodiment of the present disclosure.

Referring to FIG. 3C, a configuration of a cover member mounting part 331 of the housing 330, in which the cover member 320 of the electronic device 300 is excluded, is illustrated. The cover member mounting part 331 includes a battery pack mounting part 332 for accommodating a battery pack.

Antenna parts A1 and A2 are arranged in areas of the cover member mounting part 331. For example, the antenna part A1 is arranged in a bottom area of the electronic device 300, and the antenna part A2 is arranged in a top area of the electronic device 300. Antenna structures according to various embodiments of this disclosure may be mounted on the antenna parts A1 and A2.

For example, the antenna parts A1 and A2 include antenna patterns (or conductive patterns or antenna radiators) 340 and 350, respectively, and the antenna patterns 340 and 350 include connectors (or connecting parts) 341 and 351, respectively. The connectors 341 and 351 may extend from a metal member to be exposed or may be formed as independent metal members (e.g., metal islands) to be electrically connected to a circuit board through an electrical connecting member (e.g., a C clip). Accordingly, the antenna patterns 340 and 350 may be electrically connected to the circuit board through the connectors 341 and 351.

When the antenna pattern 340 of the antenna part A1 is electrically connected (or coupled) to the bottom side metal member 314 through the connector 341, the bottom side metal member 314 may be utilized as a parasitic antenna radiator. When the antenna pattern 340 is independently connected to the circuit board without being electrically connected to the bottom side metal member 314, the antenna pattern 340 may be utilized as an independent antenna radiator.

The antenna pattern 350 of the antenna part A2 is electromagnetically coupled to the top side metal member 313 or the left and right side metal members 311 and 312, which may be utilized as parasite antenna radiators. When the antenna pattern 350 is independently connected to the circuit board without being electrically coupled to the top side metal member 313 or the left and right side metal members 311 and 312, the antenna pattern 350 may be utilized as an independent antenna radiator.

The antenna patterns 340 and 350 may be arranged in a manner in which they overlap the connectors 341 and 351 that are exposed to the housing. The antenna patterns 340 and 350 may be direct printing antennas that are directly formed on an outer surface of the housing.

An antenna pattern may be arranged in a boundary part of the housing to which members of different materials are provided. Because a conductive material is arranged between the antenna pattern and the metal member, a crack of the antenna pattern that may be caused by the boundary part of the dissimilar materials can be prevented in advance, even when an external impact is applied to the electronic device. Accordingly, even though a crack is caused, the antenna pattern and the metal member may be continuously electrically connected to each other by a conductive member, and thus, lowering of a performance of the antenna device may be prevented in advance.

Figure 4A:
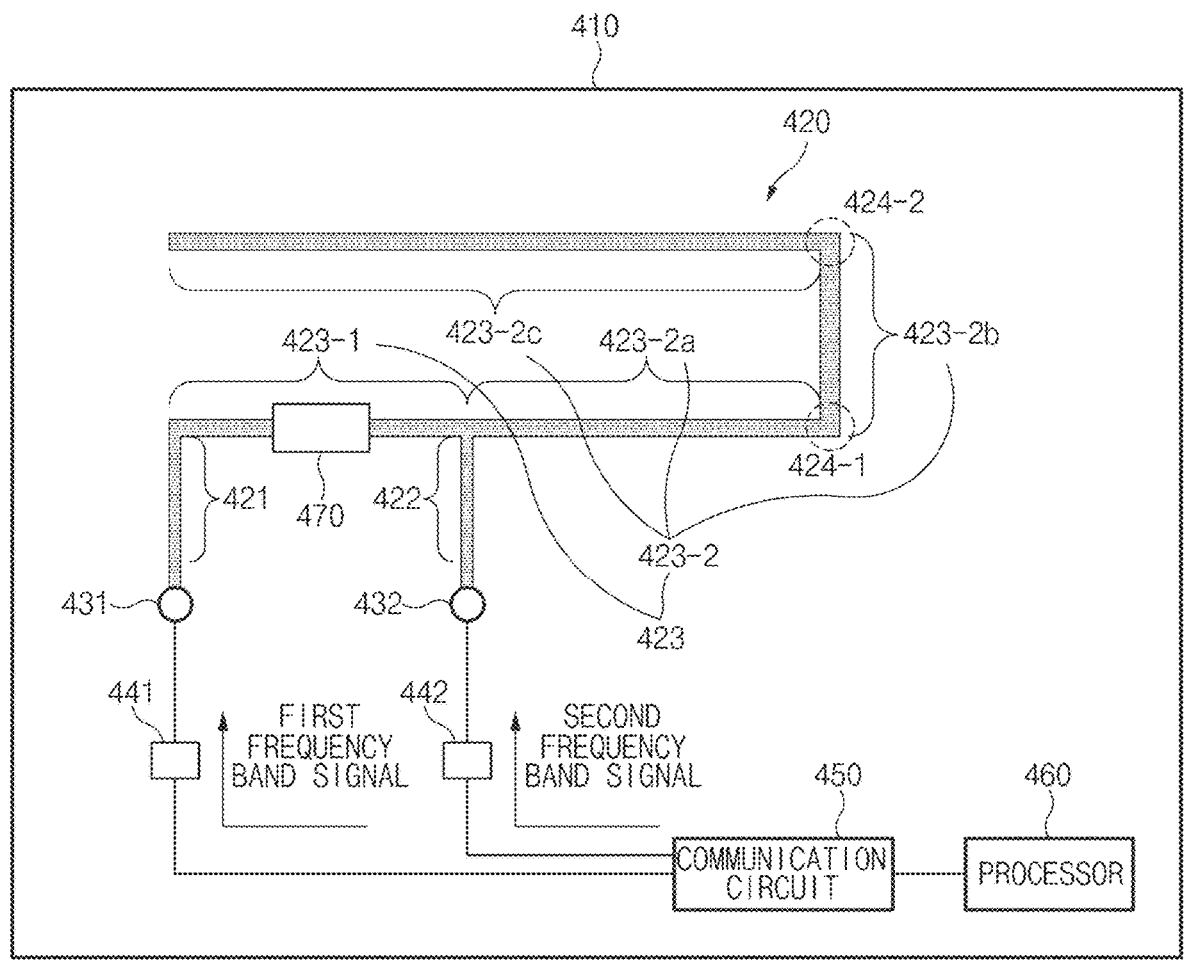
FIG. 4A illustrates an electronic device according to an embodiment of the present disclosure.

FIG. 4A illustrates an electronic device according to an embodiment of the present disclosure.

Referring to FIG. 4A, the electronic device includes a housing 410, an antenna 420, a first feeding point 431, a second feeding point 432, a first communication port 441, a second communication port 442, a communication circuit 450, and a processor 460. At least one of the elements of the electronic device may be excluded or another element may be added to the electronic device. For example, the electronic device in FIG. 4A may also include some of the elements illustrated in the electronic device of FIG. 1 and the electronic device of FIG. 2.

The electronic device illustrated in FIG. 4A may have an external appearance similar to the electronic devices of FIGS. 3A to 3C.

The housing 410 may define an external appearance of the electronic device, and may contain various elements of the electronic device therein. For example, the housing 410 may be formed of an injection-molded plastic, a metal, or a combination thereof. At least a portion (e.g., a metallic portion) of the housing 410 may be used as a part of the conductive pattern 423 (e.g., may be referenced by an antenna pattern or an antenna radiator).

The antenna 420 may transmit a signal to an external device or may receive a signal transmitted from the external device. For example, the antenna 420 may include a folded monopole antenna, at least one portion of which is folded. The antenna 420 may be arranged in the interior of the housing 410 or may be formed at least a portion of the housing 410.

The antenna 420 includes a first connecting part 421, a second connecting part 422, and a conductive pattern 423. The antenna 420 is electrically connected to the first communication port 441 and the second communication port 442 at the first feeding point 431 and the second feeding point 432, respectively.

For example, one end of the first connecting part 421 is electrically connected to the first feeding point 431, and an opposite end of the first connector 421 is electrically connected to the conductive pattern 423 (i.e., a first portion 423-1). The antenna 420 may receive a first frequency band signal from the communication circuit 450 through the first connecting part 421, the first feeding point 431, and the first communication port 441.

Further, one end of the second connecting part 422 may be electrically connected to the second feeding point 432, and an opposite end of the second connecting part 422 may be electrically connected to the conductive pattern 423 (i.e., the first portion 423-1 and the second portion 423-2). The antenna 420 may receive a second frequency band signal from the communication circuit 450 through the second connecting part 422, the second feeding point 432, and the second communication port 442.

The conductive pattern 423 includes a first portion 423-1 that connects an opposite end of the first connector 421 and an opposite end of the second connector 422, and a second portion 423-2 that extends from at least one end of the first portion 423-1. The conductive pattern 423 may include the first connector 421 and the second connector 422 as well as the first portion 423-1 and the second portion 423-2.

The second portion 423-2 includes at least one bending point (i.e., a first bending point 424-1 and a second bending point 424-2). The second portion may be segmented into section 423-2a, section 423-2b, and section 423-2c by the at least one bending point. Then, a first section of the second portion 423-2 (i.e., the section 423-2c) may be spaced apart from a second section (i.e., the section 423-2a) of the first portion 423-1 or the second portion 423-2 by a gap, such that the first section of the second portion 423-2 may be spaced apart from the second section of the first portion 423-1 or the second portion 423-2 such that the first section of the second portion 423-2 may be coupled to the second section of the first portion 423-1 or the second portion 423-2.

The first communication port 441 and the second communication port 442 are arranged inside the housing 410 and may function as an interface between the antenna 420 and the communication circuit 450. Alternatively, the first communication port 441 and the second communication port 442 may be included as a configuration of the communication circuit.

Sides of the first communication port 441 and the second communication port 442 may be electrically connected to the first feeding point 431 and the second feeding point 432, respectively, and opposite sides thereof may be electrically connected to the communication port 450. For example, the first communication port 441 and/or the second communication port 442 may be connected to the first feeding point 431 and the second feeding point 432, respectively, through a connection accessory such as C-clip or a coaxial cable. The connection accessory may be arranged on a circuit board (e.g., a printed circuit board (PCB)) of the electronic device. Further, the first communication port 441 and/or the second communication port 442 may be electrically connected to the communication circuit 450 through a printed wiring line, a coaxial cable, or a micro-strip line included in the circuit board (e.g., a PCB).

The communication circuit 450 may be electrically connected to the antenna 420 through the first communication port 441 and the second communication port 442. Here, the communication circuit 450 may include one or more types of communication circuits, such as a first Wi-Fi communication circuit and a second Wi-Fi communication circuit that use different frequencies. As another example, the communication circuit 450 may include a Wi-Fi communication circuit and a Zigbee communication circuit. Moreover, the communication circuit 450 may include at least one of a cellular communication circuit, a Wi-Fi communication circuit, or a Bluetooth communication circuit.

The communication circuit 450 may also include various filters or amplifiers for transmitting and receiving signals.

The processor 460 is electrically connected to the communication circuit 450 to control the communication circuit 450. The processor 460 may include a CP or an AP. The processor 460 may be provided as a configuration of the communication circuit 450, e.g., (as a controller of the communication circuit 450.

The processor 460 may control the communication circuit 450 to transmit or receive a first frequency band signal to or from an external device through the first communication port 441, and to transmit or receive a signal of a second frequency band to or from an external device through the second communication port 442. The second frequency band may at least partially overlap the first frequency band.

The first frequency band and the second frequency band may correspond to the substantially same band (e.g., the first frequency band completely overlaps the second frequency band). For example, the antenna 420 may transmit or receive the signals of the substantially same band that are received from the plurality of communication ports 441 and 442, through one antenna 420.

A lumped element 470 is arranged at the first portion 423-1 of the antenna 420. Because the lumped element 470 includes at least one of a capacitive element (C) or an inductive element (L), the signal of the first frequency band and the signal of the second frequency band may not interfere with each other. Further, the lumped element 470 may be set to 0Ω or may be omitted to be connected to the antenna pattern.

For example, when the lumped element 470 is omitted, the first portion 423-1 of the antenna 420 may be formed of a general conductive pattern.

The first feeding point 431, the first communication port 441, and a portion of the communication circuit 450 for supplying a first frequency band signal may be referred to as "a first feeder". Similarly, the second feeding point 432, the second communication port 442, and a portion of the communication circuit 450 for supplying a second frequency band signal may be referred to as "a second feeder". Further, the number of feeders is not limited to two and may be three or more.

Further, the configuration of the electronic device is not limited by the names of the elements therein. For example, an antenna 420 including the first connecting part 421, the second connecting part 422, and the conductive pattern 423 also may also be referred to as "an antenna radiator". Further, the first connecting part 421 and the second connecting part 422 may be referred to as "a first connecting pattern" and "a second connecting pattern", respectively, and the first portion 423-1 and the second portion 423-2 of the conductive pattern 423 may be referred to as "a first pattern" and "a second pattern", respectively.

Figure 4B:
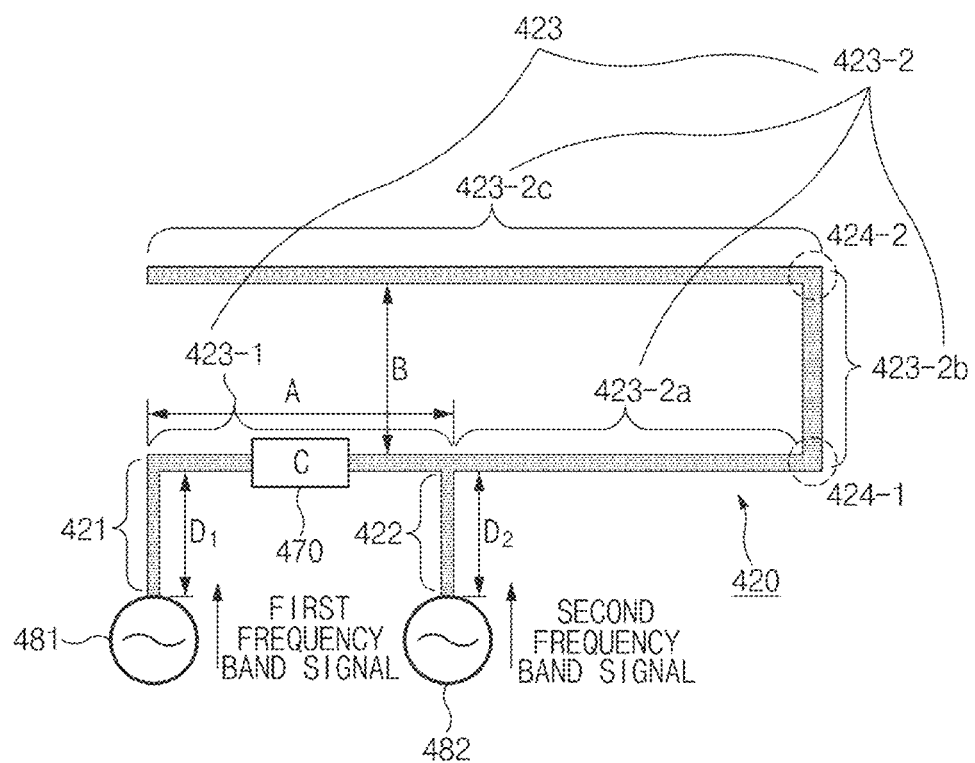
FIG. 4B illustrates an antenna structure according to an embodiment of the present disclosure.

FIG. 4B illustrates an antenna structure according to an embodiment of the present disclosure. Specifically, FIG. 4B illustrates the antenna structure of FIG. 4A with the addition of a first feeder 481 and a second feeder 482. Accordingly, in describing FIG. 4B, a repeated description of the same reference numerals as those of FIG. 4A may be omitted.

Referring to FIG. 4B, the frequency band of a first frequency band signal received from the first feeder 481 may substantially entirely overlap the frequency band of a second frequency band signal received from the second feeder 482. Accordingly, in order that a first frequency band signal and a second frequency band signal may be desirably transmitted to or received from an external device through the common antenna 420, a mutual influence between the first feeder 481 and the second feeder 482 should be minimized.

Figure 5A:
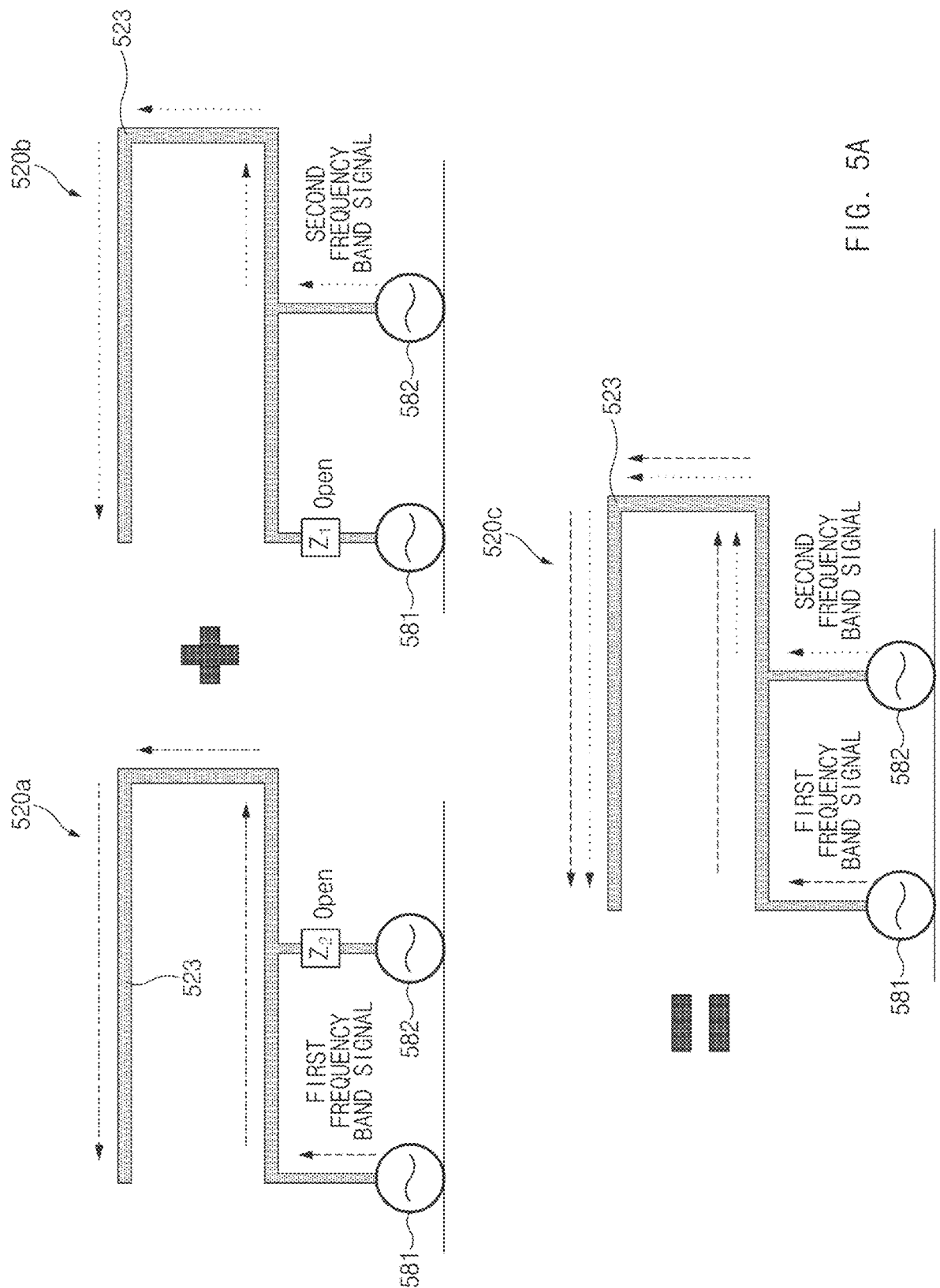
FIG. 5A illustrates mutual interference of feeders according to an embodiment of the present disclosure.

FIG. 5A illustrates mutual interference of feeders according to an embodiment of the present disclosure.

Referring to FIG. 5A, in order for a first frequency band signal to be desirably transmitted or received through a conductive pattern 523 of an antenna 520a, an equivalent impedance Z2 of a second feeder 582 viewed from a first feeder 581 should be relatively high (e.g., ∞, open). That is, the antenna 520a should be designed such that a radiation current (i.e., the first frequency band signal) of the first feeder 581 does not flow to the second feeder 582.

Further, in order for the second frequency band signal to be desirably transmitted or received through an antenna 520b, an equivalent impedance Z1 of the first feeder 581 viewed from the second feeder 582 should be relatively high (e.g., co, open) That is, the antenna 520b should be designed such that a radiation current (i.e., the second frequency band signal) of the second feeder 582 does not flow to the first feeder 581.

Considering operations of the antenna 520a and the antenna 520b, an antenna should be designed to have very high equivalent impedances Z1 and Z2 to desirably transmit or receive the first frequency band signal and the second frequency band signal. For example, referring to antenna 520c of FIG. 5A, when the feeders 581 and 582 have very high equivalent impedances Z1 and Z2 with respect to each other, the first frequency band signal and the second frequency band signal may be transmitted to and received from an external device while not interfering with each other.

In the antenna 520c, a band reject filter (or band stop filter) that may reject a signal of a specific frequency band may be used to make the equivalent impedances Z1 and Z2 high.

Figure 5B:
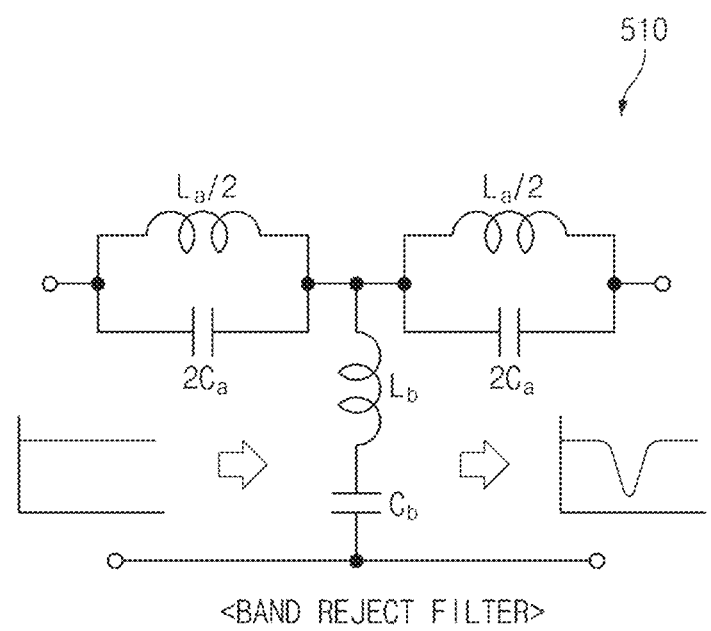
FIG. 5B illustrates a circuit diagram of a band reject filter according to an embodiment of the present disclosure.

FIG. 5B illustrates a circuit diagram of a band reject filter according to an embodiment of the present disclosure.

Referring to FIG. 5B, a band reject filter 510 includes inductive elements La/2 and Lb and capacitive elements 2Ca and Cb. The band reject filter 510 may reject a signal of a specific frequency band based on the parameters of the inductive elements and the capacitive elements. The elements of the band reject filter 510 may be equivalently implemented based on various design parameters (e.g., the lengths of portions of the conductive pattern 523 of the antenna 520c or a gap) of the antenna 520c of FIG. 5A.

Figure 5C:
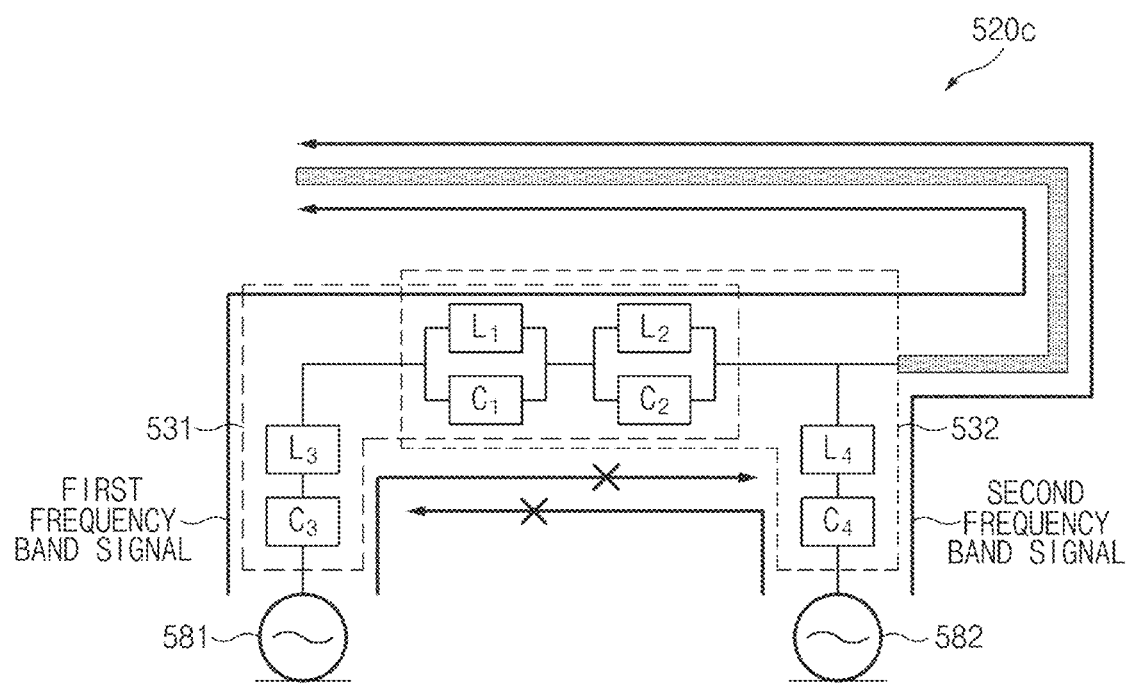
FIG. 5C illustrates an equivalent model of a band reject filter applied to an antenna structure according to an embodiment of the present disclosure.

FIG. 5C illustrates an equivalent model of a band reject filter applied to an antenna structure according to an embodiment of the present disclosure.

Referring to FIG. 5C, the antenna 520c includes equivalent models 531 and 532 of the band reject filter. The antenna 420 of FIG. 4B may be mutually referenced in relation to the description of the equivalent models 531 and 532 of the band reject filter.

The equivalent model 531 of the band reject filter includes inductive elements (or components) $L_1$, $L_2$, and $L_3$ and capacitive elements (or components) $C_1$, $C_2$, and $C_3$. The inductive element $L_1$ is connected in parallel to the capacitive element $C_1$, the inductive element $L_2$ is connected in parallel to the capacitive element $C_2$, and the inductive element $L_3$ is connected in series to the capacitive element $C_3$.

For example, referring to the antenna 420 of FIG. 4B, which also corresponds to the antenna 520c, the inductive elements $L_1$ and $L_2$ of the equivalent model 531 of the band reject filter may correspond to an inductance derived from the length A of the first portion 423-1 of the conductive pattern 423 illustrated in FIG. 4B. Further, the capacitive elements $C_1$ and $C_2$ may correspond to the capacitance derived from the gap B between the first portion 423-1 (or the section 423-2a of the second portion) and the section 423-2c of the second portion illustrated in FIG. 4B. Further, the inductive element $L_3$ may correspond to the inductance derived from the length $D_1$ of the first connecting part 421 illustrated in FIG. 4B. Further, the capacitive element $C_3$ may correspond to the capacitance derived from the gap $D_1$ between the first portion 423-1 and the first feeder 481 illustrated in FIG. 4B.

Referring again to FIG. 5C, the equivalent model 532 of the band reject filter includes inductive elements $L_1$, $L_2$, and $L_4$ and capacitive elements $C_1$, $C_2$, and $C_4$. The inductive element $L_1$ is connected in parallel to the capacitive element $C_1$, the inductive element $L_2$ is connected in parallel to the capacitive element $C_2$, and the inductive element $L_4$ is connected in series to the capacitive element $C_4$.

Referring again to the antenna 420 of FIG. 4B, which corresponds to the antenna 520c, the inductive elements $L_1$ and $L_2$ of the equivalent model 531 of the band reject filter may correspond to an inductance derived from the length A of the first portion 423-1 of the conductive pattern 423 illustrated in FIG. 4B. Further, the capacitive elements $C_1$ and $C_2$ may correspond to the capacitance derived from the gap B between the first portion 423-1 (or the section 423-2a of the second portion) and the section 423-2c of the second portion illustrated in FIG. 4B. Further, the inductive element $L_4$ may correspond to the inductance derived from the length $D_2$ of the second connecting part 422 illustrated in FIG. 4B. Further, the capacitive element $C_4$ may correspond to the capacitance derived from the gap $D_2$ between the first portion 423-1 and the second feeder 482 illustrated in FIG. 4B.

As described above, an equivalent model of the band reject filter (e.g., the equivalent model 531 and 532 of the band reject filter of FIG. 5C) may be induced based on various parameters (e.g., the length A, the length $D_1$, the length $D_2$, and the gap B illustrated in FIG. 4B) of the antenna. For example, the element parameters (e.g., $L_1$, $L_2$, $L_3$, $L_4$, $C_1$, $C_2$, $C_3$, or $C_4$) of the equivalent models 531 and 532 corresponding to the band reject filter may be induced from at least one of the lengths of the first portion 423-1, the first connecting part 421, and the second connecting part 422 of the conductive pattern 423 illustrated in FIG. 4B or the gap B.

Because the equivalent models 531 and 532 of the band reject filter is equivalently implemented in the antenna 520c, the equivalent impedance the second feeder 582 viewed from the first feeder 581 and the equivalent impedance of the first feeder 581 viewed from the second feeder 582 may be high. Accordingly, the signal of the first frequency band by the first feeder 581 and the signal of the second frequency band by the second feeder 582 should not interfere with each other.

The first frequency band and the second frequency band may correspond to the substantially same band. That is, the first frequency band and the second frequency band may entirely overlap each other. In this case, because the lengths of a path along which the first frequency band signal is transmitted (e.g., the first connecting part 421, the first portion 423-1, and the second portion 423-2 of FIG. 4B) and a path along which the second frequency band signal is transmitted (e.g., the second connecting part 422 and the second portion 423-2 of FIG. 4B) should be substantially the same, the length A of the first portion 423-1 may be short.

Because a frequency interference between the first feeder 481 and the second feeder 482 may increase if the length A of the first portion 423-1 is set to be shortest, various design parameters (e.g., B, $D_1$, and $D_2$) for implementing the equivalent model 530 of the band reject filter depending on the value of the length A may be adjusted. Based on the equivalent model 530 of the band reject filter, an isolation between the first frequency band signal and the second frequency band signal may be improved.

A lumped element may also be included in the antenna to implement the equivalent model 530 of the band reject filter.

For example, referring again to FIG. 4B, the lumped element 470 may be arranged at the first portion 423-1 of the conductive pattern 423 of the antenna 420. Because the lumped element 470 includes at least one of a capacitive element or an inductive element, design limitations of various parameters (e.g., B, $D_1$, and $D_2$) for implementing the equivalent model 530 of the band reject filter may be supplemented. That is, the element parameters of the lumped element 470 may be included in design parameters of the equivalent model corresponding to the band reject filter. Depending on the preset values of the element parameters of the lumped element 470, the first frequency band signal and the second frequency band signal substantially may not interfere with each other.

For example, when the values of the inductances $L_1$ and L2, induced from the length A of the first portion 423-1 of the antenna 420, are not large enough to implement the equivalent model 530 of the band reject filter, the lumped element 470 may include an inductive element to supplement a restriction of the inductance.

Figure 6A:
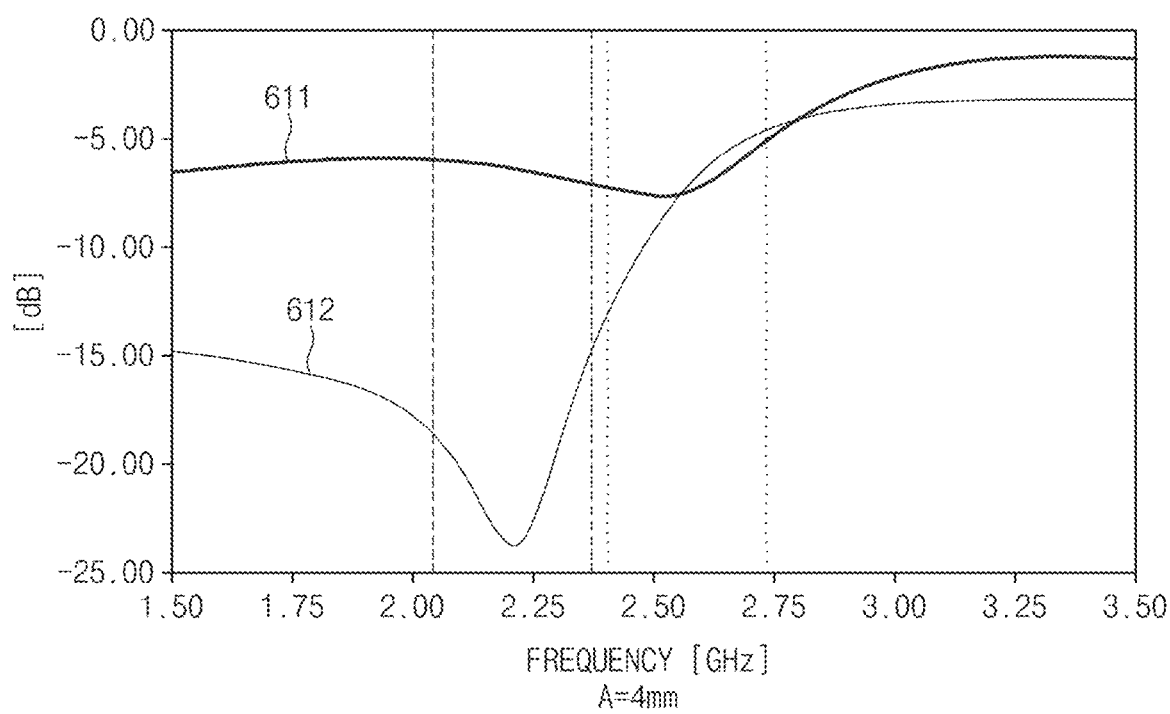
FIG. 6A is a graph illustrating an S parameter according to frequency when the length of a first part is 4 mm according to an embodiment of the present disclosure.
Figure 6B:
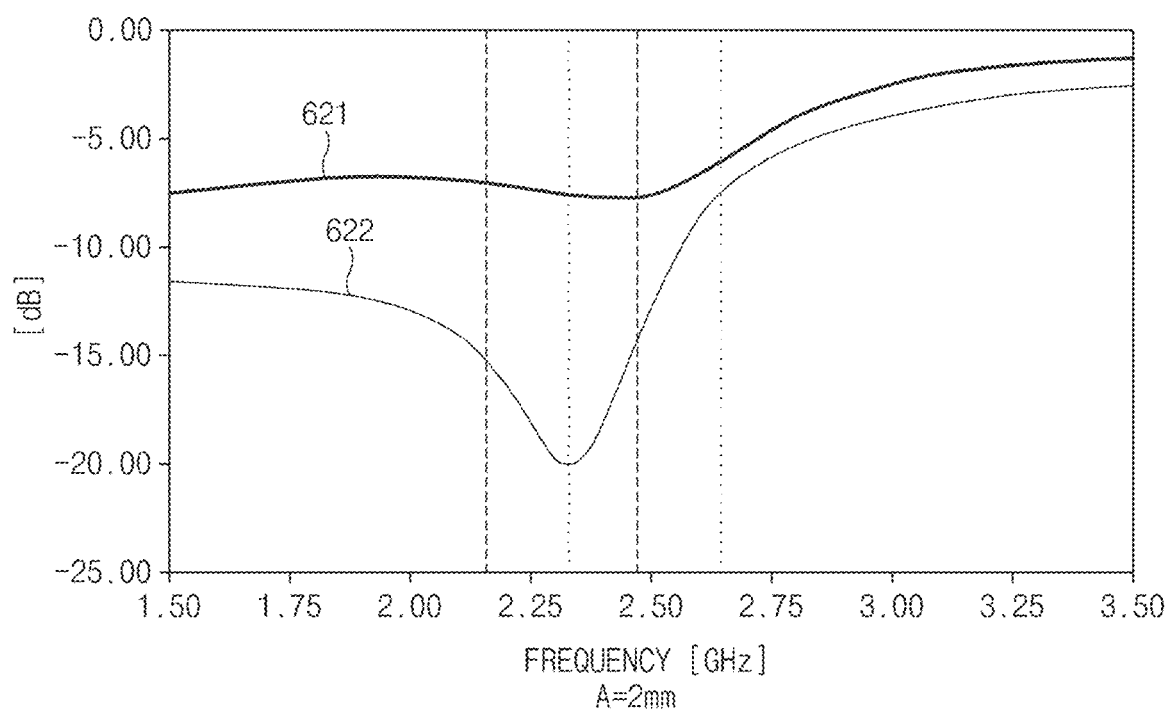
FIG. 6B is a graph illustrating an S parameter according to frequency when the length of a first part is 2 mm according to an embodiment of the present disclosure.
Figure 6C:
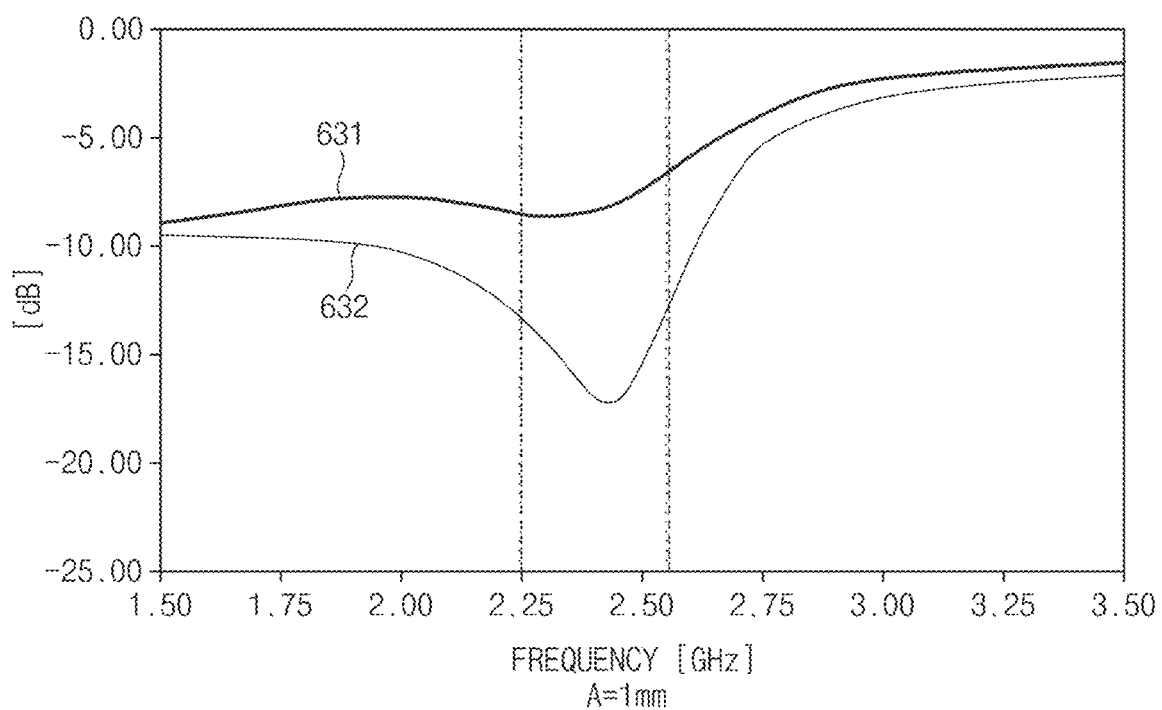
FIG. 6C is a graph illustrating an S parameter according to frequency when the length of a first part is 1 mm according to an embodiment of the present disclosure.

FIGS. 6A and 6C are graphs illustrating a scattering (S) parameter depending on a length of a first portion according to an embodiment of the present disclosure.

As described above, the first portion 423-1 of the conductive pattern 423 of FIG. 4B may correspond to one of the design parameters for operating (or resonating) the first feeder 481 and the second feeder 482 that share one antenna 420.

FIGS. 6A, 6B, and 6C illustrate a change in an S parameter based on frequency when the length A of the first portion 423-1 is 4 mm, 2 mm, and 1 mm, respectively. In describing FIGS. 6A, 6B, and 6C, the reference numerals of FIG. 4B will also be used.

Referring to FIG. 6A, a curve 611 represents a reflection coefficient S11 of the first feeder 481 of FIG. 4B based on frequency, and a curve 612 represents a reflection coefficient S22 of the second feeder 482 based on frequency. The length A of the first portion 423-1 may be set to 4 mm. According to the curve 611, a resonance frequency of the first feeder 481 is about 2.55 GHz, and an operational frequency of the first feeder 481 is 2.4 GHz to 2.7 GHz. According to the curve 612, a resonance frequency of the second feeder 482 is about 2.20 GHz, and an operational frequency of the second feeder 481 is 2.05 GHz to 2.35 GHz.

Referring to FIG. 6B, a curve 621 represents a reflection coefficient S11 of the first feeder 481 based on frequency, and a curve 622 represents a reflection coefficient S22 of the second feeder 482 based on frequency. The length A of the first portion 423-1 may be set to 2 mm. According to the curve 621, a resonance frequency of the first feeder 481 is about 2.47 GHz, and an operational frequency of the first feeder 481 is 2.35 GHz to 2.65 GHz. According to the curve 622, a resonance frequency of the second feeder 482 is about 2.30 GHz, and an operational frequency of the second feeder 482 is 2.15 GHz to 2.45 GHz.

Referring to FIG. 6C, a curve 631 represents a reflection coefficient S11 of the first feeder 481 based on frequency, and a curve 632 represents a reflection coefficient S22 of the second feeder 482 based on frequency. The length A of the first portion 423-1 may be set to 1 mm. According to the curve 631, a resonance frequency of the first feeder 481 is about 2.40 GHz, and an operational frequency of the first feeder 481 is 2.25 GHz to 2.55 GHz. Like the curve 631, in a curve 632, a resonance frequency of the second feeder 482 is about 2.40 GHz, and an operational frequency of the second feeder 482 is 2.25 GHz to 2.55 GHz.

The operational frequency corresponding to the length A of the first portion 423-1 may be summarized, as shown in Table 1 below, from the curves of FIGS. 6A, 6B, and 6C.

TABLE 1

| Length A of first portion | Operational frequency by first feeder | Operational frequency by second feeder |
| --- | --- | --- |
| 4 mm (FIG. 6A) | 2.4 GHz to 2.7 GHz | 2.05 GHz to 2.35 GHz |
| 2 mm (FIG. 6B) | 2.35 GHz to 2.65 GHz | 2.15 GHz to 2.45 GHz |
| 1 mm (FIG. 6C) | 2.25 GHz to 2.55 GHz | 2.25 GHz to 2.55 GHz |

According to Table 1, as the length A of the first portion 423-1 becomes shorter, the operational frequencies of the first feeder 481 and the second feeder 482 get closer. This is because in order for the first feeder 481 and the second feeder 482 to transmit or receive the same frequency, the length of a path along which a signal from the first feeder 481 is transmitted and the length of a path along which a signal from the second feeder 482 is transmitted should be substantially the same.

Figure 7A:
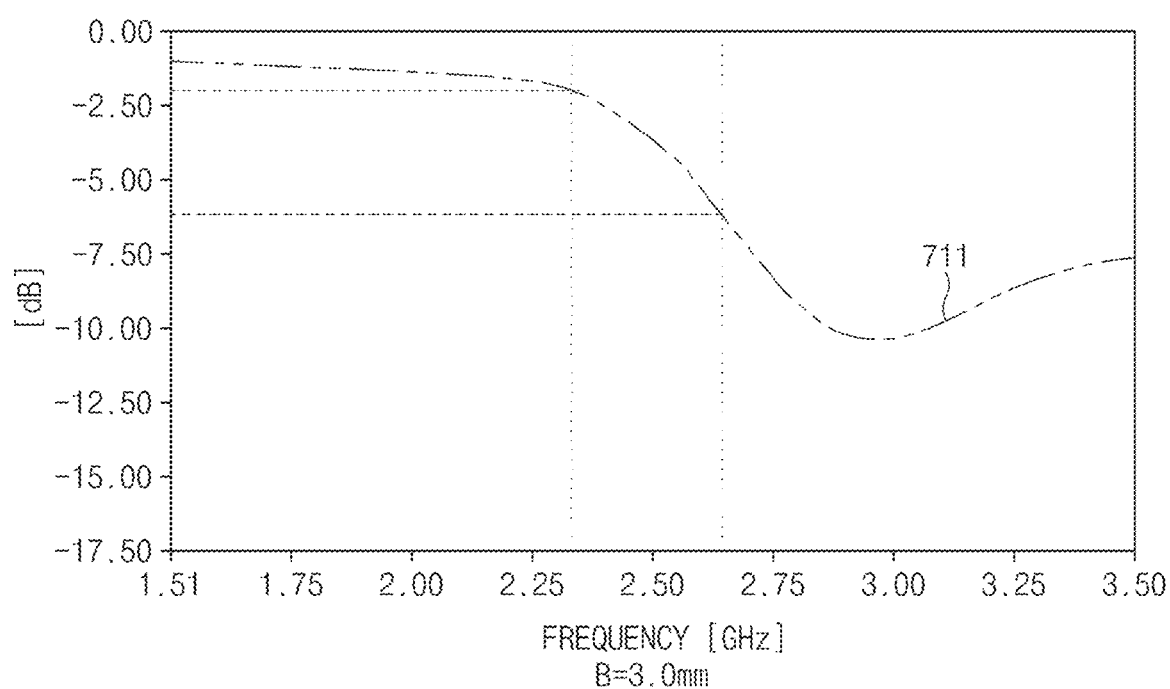
FIG. 7A is a graph illustrating an S parameter according to frequency when design parameter B is 3 mm according to an embodiment of the present disclosure.
Figure 7B:
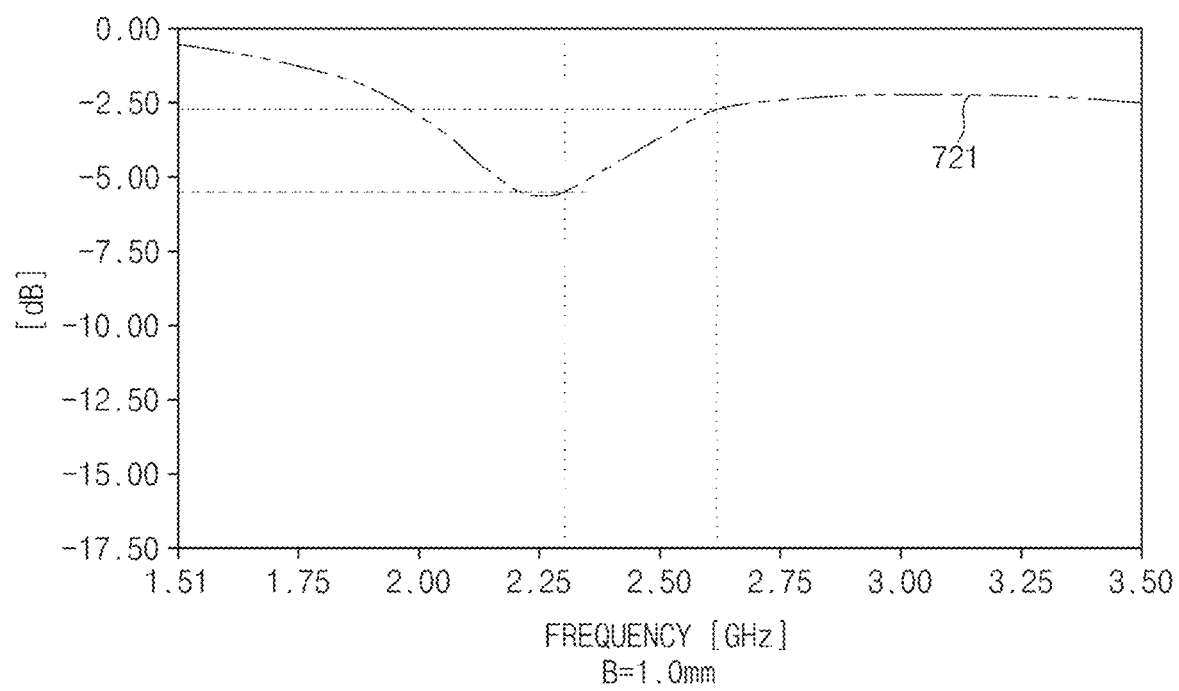
FIG. 7B is a graph illustrating an S parameter according to frequency when design parameter B is 1 mm according to an embodiment of the present disclosure.
Figure 7C:
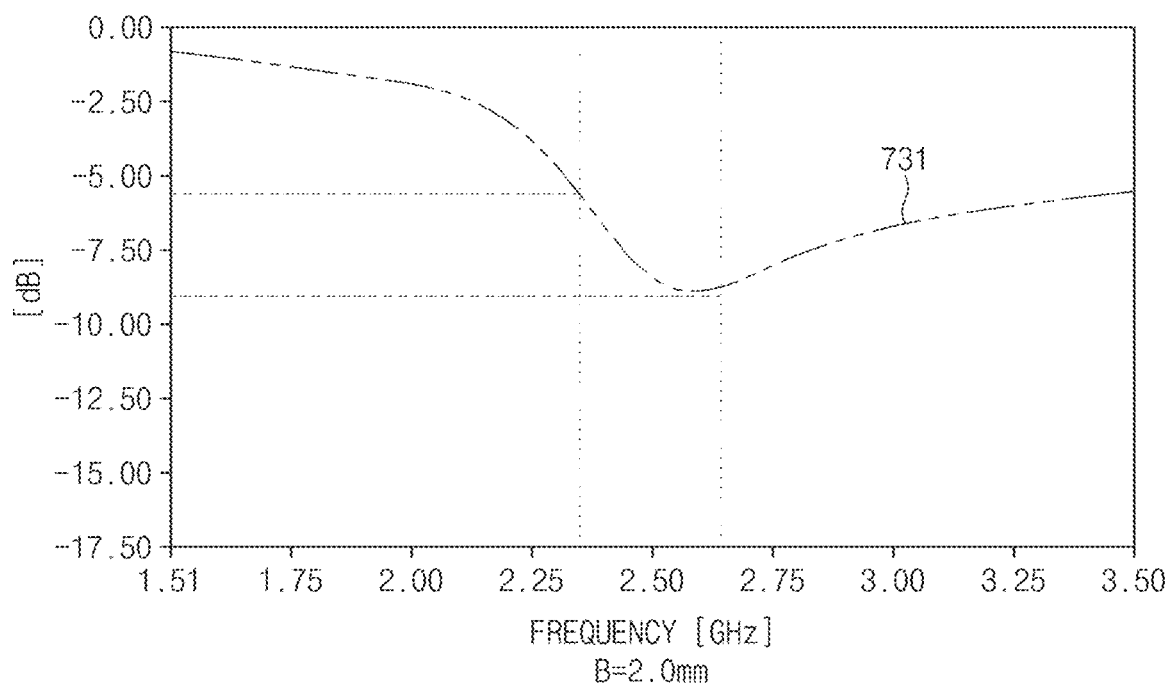
FIG. 7C is a graph illustrating an S parameter according to frequency when design parameter B is 2 mm according to an embodiment of the present disclosure.

FIGS. 7A to 7C illustrate an S parameter based on a gap according to an embodiment of the present disclosure.

Referring first to FIG. 4B, in the conductive pattern 423 of the antenna 420, a gap B (hereinafter, a design parameter B) between the first portion 423-1 (or the portion 423-2a) and the portion 423-2c may correspond to one of the design parameters that determine an isolation between two feeders that share the antenna 420. Specifically, FIGS. 7A, 7B, and 7C represent a change in an S parameter based on frequency when the design parameter B is 3 mm, 1 mm, and 2 mm, respectively.

Referring to FIG. 7A, a curve 711 represents an S parameter S21 of the second feeder 482 for the first feeder 481 based on frequency when the design parameter B is 3 mm. According to the curve 711, an isolation of the first feeder 481 and the second feeder 482 has a value of −2 dB to −6 dB at an operational frequency band (2.35 GHz to 2.65 GHz).

Referring to FIG. 7B, a curve 721 represents an S parameter S21 of the second feeder 482 for the first feeder 481 based on frequency when the design parameter B is 1 mm. According to the curve 721, an isolation of the first feeder 481 and the second feeder 482 has a value of −4 dB to −6 dB at an operational frequency band (2.35 GHz to 2.65 GHz).

Referring to FIG. 7C, a curve 731 represents an S parameter S21 of the second feeder 482 for the first feeder 481 based on frequency when the design parameter B is 2 mm. According to the curve 731, an isolation of the first feeder 481 and the second feeder 482 has a value of −6 dB to −9 dB at an operational frequency band (2.35 GHz to 2.65 GHz).

The isolation corresponding to the design parameter B may be summarized, as shown in Table 2 below, from the curves of FIGS. 7A, 7B, and 7C.

TABLE 2

| Design parameter B | Isolation | Operational frequency by first feeder | Operational frequency by second feeder |
|---|---|---|---|
| 3 mm (FIG. 7A) | −2 to −6 dB | 2.35 GHz to 2.65 GHz | 2.35 GHz to 2.65 GHz |
| 1 mm (FIG. 7B) | −4 to −6 dB | 2.35 GHz to 2.65 GHz | 2.35 GHz to 2.65 GHz |
| 2 mm (FIG. 7C) | −6 to −9 dB | 2.35 GHz to 2.65 GHz | 2.35 GHz to 2.65 GHz |

According to Table 2, when the design parameter B is 2 mm, the isolation may be most improved. According to the change of the design parameter B, a capacitance induced between the first portion 423-1 (or the portion 423-2a) and the portion 423-2c of the conductive pattern 423 may change. The capacitance may influence a configuration of the equivalent model of the band reject filter. According to Table 2, the optimum capacitance for a band reject filter at the operational frequency bands (2.35 GHz to 2.65 GHz) of the first feeder 481 and the second feeder 482 may be implemented when the design parameter B is 2 mm.

A gap $D_1$ between the first portion 423-1 and the first feeder 481 of FIG. 4B and/or a gap $D_2$ between a section 423-2a of the second portion and the second feeder 482 may perform the same function as that of the design parameter B.

As described above, an antenna structure in which a plurality of feeders are provided in one antenna radiator and an electronic device including the same may be provided, such that the antenna structure may transmit or receive a signal of the same frequency band through a plurality of feeders while maintaining a high isolation between a plurality of feeders, based on various design parameters. Accordingly, when compared with a conventional technology in which a plurality of antenna radiators are required in a plurality of feeders, an interior space of an electronic device may be additionally secured, and manufacturing costs may be reduced by decreasing the number of antenna radiators.

Figure 8A:
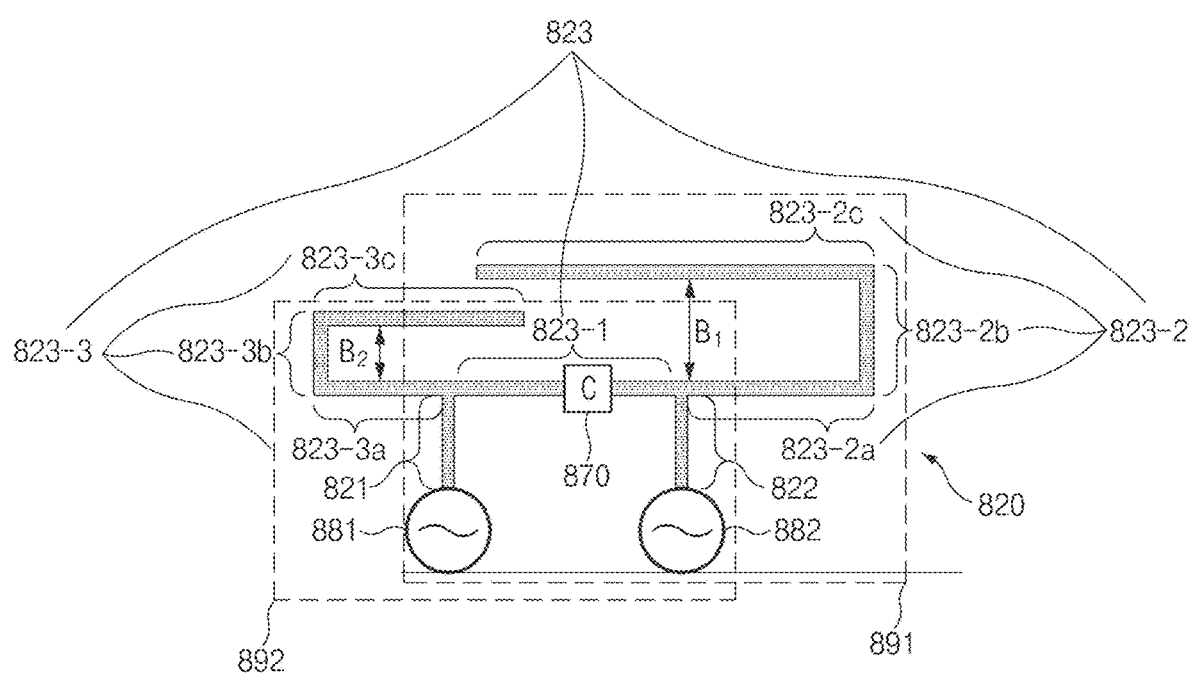
FIG. 8A illustrates a multiple resonance antenna structure according to an embodiment of the present disclosure.

FIG. 8A illustrates a multiple resonance antenna structure according to an embodiment of the present disclosure;

Referring to FIG. 8A, the multiple resonance antenna structure includes a first feeder 881, a second feeder 882, and an antenna 820.

The antenna 820 includes a first connecting part 821, a second connecting part 822, and a conductive pattern 823. The conductive pattern 823 is electrically connected to the first feeder 881 and the second feeder 882 through the first connecting part 821 and the second connecting part 822. For example, one end of the first connecting part 821 is electrically connected to the first feeder 881, and an opposite end of the first connecting part 821 is electrically connected to the conductive pattern 823. Further, one end of the second connecting part 822 is electrically connected to the second feeder 882, and an opposite end of the second connecting part 822 is electrically connected to the conductive pattern 823.

The conductive pattern 823 includes a first portion 823-1, a second portion 823-2, and a third portion 823-3. Although FIG. 8 illustrates the second portion 823-2 and the third portion 823-3 being separately classified for convenience of description, the second portion 823-2 may be referred to as "a section of the second portion extending from one end of the first portion 823-1" and the third portion 823-3 may be referred to as "another section of the second portion extending from an opposite end of the first portion 823-1".

The first portion 823-1 may correspond to a part of the conductive pattern 823 that connects the opposite end of the first connecting part 821 and the opposite end of the second connecting part 822.

A lumped element 870 is arranged at the first portion 823-1.

The second portion 823-2 and the third portion 823-3 extend from opposite ends of the first portion 823-1.

The second portion 823-2 extends from one end of the first portion 823-1. The second portion 823-2 includes at least one bending point and has a section 823-2a, a section 823-2b, and a section 823-2c. The section 823-2c is spaced apart from the first portion 823-1 or the 2a-th section 823-2a by a specific gap $B_1$ to be electromagnetically coupled to the first portion 823-1 or the 2a-th section 823-2a.

The third portion 823-3 extends from an opposite end of the first portion 823-1. The third portion 823-3 includes at least one bending point and has a section 823-3a, a section 823-3b, and a section 823-3c. The 3c-th section 823-3c is spaced apart from the first portion 823-1 or the 3a-th section 823-2a by a specific gap $B_2$ to be electromagnetically coupled to the first portion 823-1 or the 3a-th section 823-3a.

The frequency of a signal that is transmitted and received through a portion (e.g., the second portion 823-2) extending from one end of the first portion 823-1 may be set to be different from the frequency of a signal that is transmitted and received through a portion (e.g., the third portion 823-3) extending from an opposite end of the first portion 823-1. Accordingly, the length of the second portion 823-2 extending from one end of the first portion 823-1 and the length of the third portion 823-3 extending from an opposite end of the first portion 823-1 may be different.

For example, a first resonance pattern 891 may be used to transmit or receive a signal of 2.4 GHz, and a second resonance pattern 892 may be used to transmit or receive a signal of 5 GHz. The first resonance pattern 891 includes the first feeder 881, the second feeder 882, the first connecting part 821, the second connecting part 822, and the first portion 823-1 and the second portion 823-2 of the conductive pattern 823. Further, the second resonance pattern 892 includes the first feeder 881, the second feeder 882, the first connecting part 821, the second connecting part 822, and the first portion 823-1 and the second portion 823-3 of the conductive pattern 823. The length of the third portion 823-3 may be shorter than the length of the second portion 823-2.

Using a multiple resonance antenna structure as illustrated in FIG. 8A, a multiple resonance MIMO diversity antenna may be implemented that may be utilized in a plurality of frequency bands.

Figure 8B:
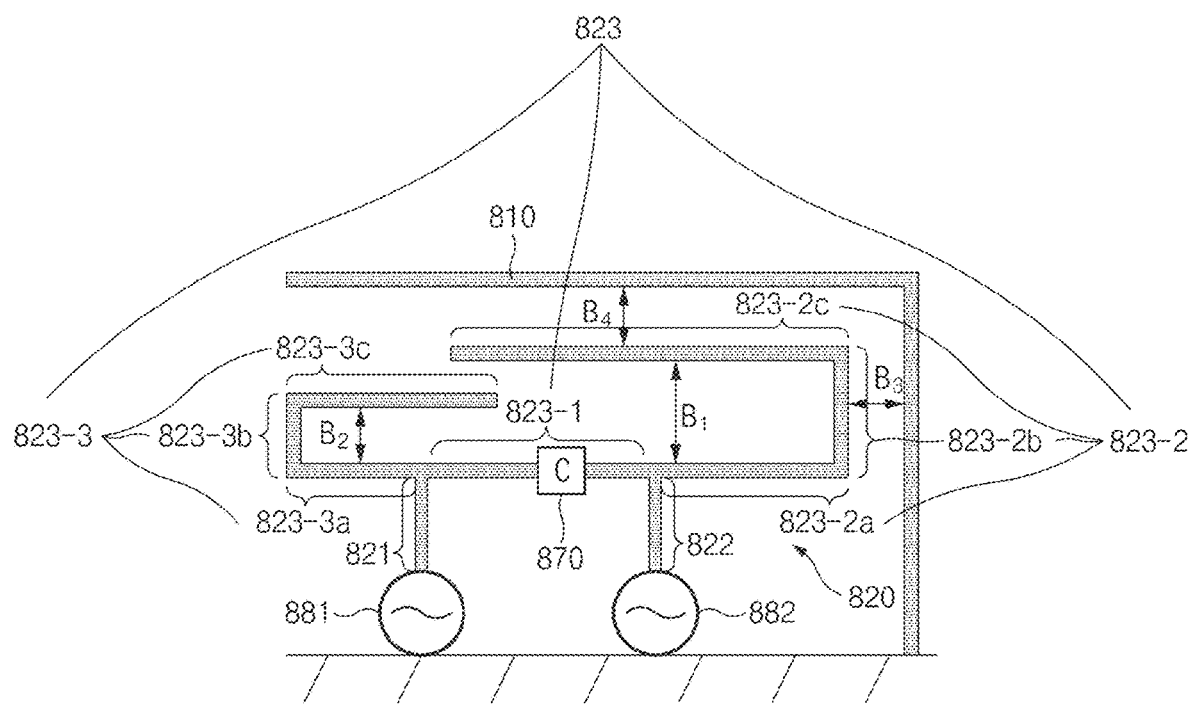
FIG. 8B illustrates a multiple resonance antenna structure in a metal housing according to an embodiment of the present disclosure.

FIG. 8B illustrates a multiple resonance antenna structure in a metal housing according to an embodiment of the present disclosure.

Referring to FIG. 8B, a multiple resonance antenna structure (for example, the multiple resonance antenna structure of FIG. 8A) is included in a housing 810. In describing FIG. 8B, a repeated description of the same reference numerals as those of FIG. 8A may be omitted.

At least a portion of the housing 810 may be formed of a conductive material (e.g., metal). The portion of the housing 810, which is formed of a conductive material, may be spaced apart from the second portion 823-2 of the conductive pattern 823 to be electromagnetically coupled to the second portion 823-2 of the conductive pattern 823.

For example, the portion of the housing 810, which is formed of a conductive material, may be spaced apart from the section 823-2b of the second portion 823-2 by a gap $B_3$ to be coupled to the section 823-2b of the second portion

823-2. Another portion of the housing 810, which is formed of a conductive material, may be spaced apart from the section 823-2c of the second portion 823-2 by a gap $B_4$ to be coupled to the section 823-2c of the second portion 823-2. Further, the portion of the housing 810, which is formed of a conductive material, may be spaced apart from at least a section of the third portion 823-3 of the conductive pattern 823 to be coupled to the third portion 823-3 of the conductive pattern 823.

The gaps $B_3$ and $B_4$ may be considered as design parameters for implementing an equivalent model of the band reject filter, as described above with reference to FIGS. 4B, 5A, 5B, and 5C.

Because the antenna structures described herein may be electrically coupled to the housing formed of a conductive material (e.g., metal), the housing may be utilized as an additional antenna radiator. Accordingly, an antenna structure received in the housing may be relatively small-sized, without lowering of the performance of the antenna due to the housing being formed of a conductive material.

In accordance with an aspect of this disclosure, there is provided an electronic device including a housing, a first communication port and a second communication port that are arranged inside the housing, an antenna that is arranged inside the housing or is formed at at least a portion of the housing to be electrically connected to the first communication port and the second communication port at a first feeding point and a second feeding point, respectively, a communication circuit that is electrically connected to the first communication port and the second communication port, and a processor that is electrically connected to the communication circuit. The antenna may include a first connecting part one end of which is electrically connected to the first feeding point, a second connecting part one end of which is electrically connected to the second feeding point, and a conductive pattern including a first portion that connects an opposite end of the first connecting part and an opposite end of the second connecting part and a second portion that extends from at least one end of the first portion. The processor may cause the communication circuit to transmit or receive a signal of a first frequency band to and from an external device, through the first communication port, and transmit or receive a signal of a second frequency band that at least partially overlaps the first frequency band, through the second communication port.

According to an embodiment, the second portion of the conductive pattern may include at least one bending point, and a first section of the second portion is spaced apart from the first portion or a second section of the second portion by a gap such that the first section of the second portion is coupled to the first portion or the second section of the second portion.

According to an embodiment, at least one of the lengths of the first portion, the first connecting part, and the second connecting part of the conductive pattern, or the gap may correspond to or may be included in a design parameter of an equivalent model corresponding to the band reject filter.

According to an embodiment, at least one of the lengths of the first part, the first connecting part, and the second connecting part of the conductive pattern, or the gap may be set such that the signal of the first frequency band and the signal of the second frequency band do not interfere with each other.

According to an embodiment, a lumped element including at least one of a capacitive element or an inductive element may be arranged at the first portion of the conductive pattern. An element parameter of the lumped element may be included in a design parameter of an equivalent model corresponding to the band reject filter.

According to an embodiment, the element parameter of the lumped element may be set such that a signal of the first frequency band and a signal of the second frequency band do not interfere with each other.

According to an embodiment, the first frequency band and the second frequency band may correspond to the substantially same band.

According to an embodiment, the second portion of the conductive pattern may include a plurality of second portions, the second portions of the conductive pattern may extend from an end and an opposite end of the first portion, and the second portion that extends from one end of the first portion and the second portion that extends from an opposite end of the first portion may have different lengths.

According to an embodiment, at least one of the housing may include a conductive material, and the second portion of the conductive pattern may be spaced apart from at least a portion of the housing to be coupled to the at least a portion of the housing.

According to an embodiment, the communication circuit may include at least one of a cellular communication circuit, a Wi-Fi communication circuit, or a Bluetooth communication circuit.

According to an embodiment, the antenna may include a monopole antenna.

According to an aspect of this disclosure, there is provided an antenna structure of an electronic device, the antenna structure including an antenna radiator, and a first feeding part and a second feeding part that are electrically connected to the antenna radiator. The antenna radiator may include a first connection pattern one end of which is electrically connected to the first feeding part, a second connection pattern one end of which is electrically connected to the second feeding part, a first pattern that connects an opposite end of the first connection pattern and an opposite end of the second connection pattern, and a second pattern that extends from at least one end of the first pattern. The first feeding part may be configured to transmit or receive a signal of a first frequency band to and from an external device, and the second feeding part may be configured to transmit or receive a signal of a second frequency band that at least partially overlap the first frequency band to and from the external device.

According to an embodiment, the second pattern of the antenna radiator may include at least one bending point, and a first section of the second pattern may be spaced apart from the first pattern or a second section of the second pattern by a gap such that the first section of the second pattern is coupled to the first pattern or the second section of the second pattern.

According to an embodiment, at least one of the lengths of the first pattern, the first connecting pattern, and the second connecting pattern of the antenna radiator, or the gap may be included in a design parameter of an equivalent model corresponding to the band reject filter.

According to an embodiment, at least one of the lengths of the first pattern, the first connecting pattern, and the second connecting pattern of the conductive pattern, or the gap is set such that a signal of the first frequency band and a signal of the second frequency band do not interfere with each other.

According to an embodiment, a lumped element including at least one of a capacitive element or an inductive element may be arranged at the first pattern of the antenna radiator. An element parameter of the lumped element may be included in a design parameter of an equivalent model corresponding to the band reject filter.

According to an embodiment, the element parameter of the lumped element may be set such that a signal of the first frequency band and a signal of the second frequency band do not interfere with each other.

According to an embodiment, the at least one second portion of the conductive pattern comprises a plurality of second portions, the second pattern of the antenna radiator may extend from opposite ends of the first pattern, and the second pattern that extends from one end of the first pattern and the second pattern that extends from an opposite end of the first pattern have different lengths.

According to an embodiment, at least a portion of the housing of the electronic device may be formed of a conductive material, and the second pattern of the antenna radiator may be spaced apart from at least a portion of the housing to be coupled to the at least a portion of the housing.

According to an embodiment, the antenna structure may include a monopole antenna structure.

Herein, the term "module" may mean a unit including, for example, one of hardware, software, or firmware or a combination of the two or more of them. The term "module" may be interchangeably used with a unit, a logic, a logical block, a component, a circuit, etc. A module may be a minimum unit or a part of an integrally configured part, which performs one or more functions.

A module may be implemented mechanically or electromagnetically. For example, a module may include at least one of an application-specific integrated circuit (ASIC) chip, a field-programmable gate array, or a programmable-logic device, which has been known, will be developed in the future, or performs certain operations.

At least some of the devices (e.g., modules or functions) or methods (e.g., operations) according to various embodiments of the present disclosure may be implemented by an instruction stored in a computer-readable storage medium, e.g., in the form of a program module. When the instruction is executed by the processor (e.g., the processor 120), the at least one processor may control an electronic device to perform a function corresponding to the instruction. The computer-readable storage medium may be a memory, e.g., the memory 130.

The computer-readably storage medium may include a hard disk, a floppy disk, a magnetic medium (e.g., a magnetic tape), an optical medium (e.g., a compact disk read only memory (CD-ROM)), a DVD, a magneto-optical medium (e.g., a floptical disk), a hardware device (e.g., a ROM, a random access memory (RAM), or a flash memory). Further, the program instruction may include high-level language codes that may be executed by a computer using an interpreter, as well as machine languages created by using a compiler. The above-mentioned hardware device may be configured to be operated as one or more software module to perform operations of various embodiments, and the converse is applied.

The module or program module according to various embodiments of the present disclosure may include at least one of the above-mentioned elements, omit some of them, or further include other elements. The module, the program module, or the operations performed by other elements according to various embodiments of this disclosure may be performed in a sequential, parallel, iterative, and/or heuristic method. Further, some operations may be executed in another sequence or may be omitted, or other operations may be added.

According to an embodiment of the present disclosure, an antenna structure may transmit or receive signals of various frequency bands through a plurality of feeders while maintaining a high isolation between the plurality of feeders, based on various design parameters thereof. In addition, this disclosure may provide various effects that are directly or indirectly recognized.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
 a first communication port;
 a second communication port;
 an antenna that is electrically connected to the first communication port and the second communication port at a first feeding point and a second feeding point, respectively,
 wherein the antenna comprises:
  a first connecting part including a first end and a second end, the first end of the first connecting part being electrically connected to the first feeding point;
  a second connecting part including a first end and second end, the first end of the second connecting part being electrically connected to the second feeding point; and
  a conductive pattern including a first portion that connects the second end of the first connecting part and the second end of the second connecting part, and a second portion that extends from at least one end of the first portion;
 a communication circuit that is electrically connected to the first communication port and the second communication port;
 a lumped element including at least one of a capacitive element and an inductive element arranged at the first portion of the conductive pattern; and
 a processor that is electrically connected to the communication circuit,
 wherein the processor controls the communication circuit to:
  transmit or receive a signal of a first frequency band, through the first communication port; and
  transmit or receive a signal of a second frequency band that at least partially overlaps the first frequency band, through the second communication port,
 wherein the second portion of the conductive pattern comprises at least one bending point, and
 wherein an element parameter of the lumped element is set such that the signal of the first frequency band and the signal of the second frequency band do not interfere with each other.

2. The electronic device of claim 1, wherein the first frequency band and the second frequency band correspond to substantially a same band.

3. The electronic device of claim 1, wherein the second portion of the conductive pattern comprises a plurality of second sections that extend from opposite ends of the first portion, and
 wherein a first section of the second portion that extends from a first end of the first portion and a second section of the second portion that extends from a second end of the first portion have different lengths.

4. The electronic device of claim 1, further comprising a housing,
wherein at least a portion of the housing comprises a conductive material, and
wherein the second portion of the conductive pattern is spaced apart from the at least the portion of the housing.

5. The electronic device of claim 1, wherein the communication circuit comprises at least one of a cellular communication circuit, a Wi-Fi communication circuit, and a Bluetooth communication circuit.

6. The electronic device of claim 1, wherein the antenna comprises a monopole antenna.

7. The electronic device of claim 1, wherein a first section of the second portion is spaced apart from the first portion or a second section of the second portion by a gap, and
wherein at least one of a length of the first portion, a length of the first connecting part, a length of the second connecting part and a length of the gap is included in a design parameter of an equivalent model corresponding to a band reject filter.

8. The electronic device of claim 7, wherein the at least one of the length of the first portion, the length of the first connecting part, the length of the second connecting part, and the length of the gap is set such that the signal of the first frequency band and the signal of the second frequency band do not interfere with each other.

9. An antenna structure, comprising:
a first feeding part;
a second feeding part;
a lumped element including at least one of a capacitive element and an inductive element arranged at the first pattern of the antenna radiator; and
an antenna radiator including:
a first connection pattern including a first end and a second end, the first end of the first connection pattern being electrically connected to the first feeding part;
a second connection pattern including a first end and a second end, the first end of the second connection pattern being electrically connected to the second feeding part;
a first pattern that connects the second end of the first connection pattern and the second end of the second connection pattern; and
a second pattern that extends from at least one end of the first pattern,
wherein the first feeding part is configured to transmit or receive a signal of a first frequency band, and the second feeding part is configured to transmit or receive a signal of a second frequency band that at least partially overlaps the first frequency band,
wherein the second pattern comprises at least one bending point, and
wherein an element parameter of the lumped element is set such that the signal of the first frequency band and the signal of the second frequency band do not interfere with each other.

10. The antenna structure of claim 9,
wherein the element parameter of the lumped element is included in a design parameter of an equivalent model corresponding to a band reject filter.

11. The antenna structure of claim 9, wherein the second pattern of the conductive pattern comprises a plurality second sections that extend from opposite ends of the first pattern, and
wherein a first section of the second pattern that extends from a first end of the first pattern and a second section of the second pattern that extends from a second end of the first pattern have different lengths.

12. The antenna structure of claim 9, further comprising a housing of an electronic device,
wherein at least a portion of the housing of the electronic device is formed of a conductive material, and
wherein the second pattern is spaced apart from the at least a portion of the housing.

13. The antenna structure of claim 9, wherein the antenna structure comprises a monopole antenna structure.

14. The antenna structure of claim 9, wherein a first section of the second pattern is spaced apart from the first pattern or a second section of the second pattern by a gap, and
wherein at least one of a length of the first pattern, a length of the first connecting pattern, a length of the second connecting pattern, and a length of the gap is included in a design parameter of an equivalent model corresponding to a band reject filter.

15. The antenna structure of claim 14, wherein the at least one of the length of the first pattern, the length of the first connecting pattern, the length of the second connecting pattern, and the length of the gap is set such that the signal of the first frequency band and the signal of the second frequency band do not interfere with each other.

16. An electronic device comprising:
a communication circuit configured to electrically drive a first communication port and a second communication port;
a processor configured to control the communication circuit; and
an antenna electrically connected to the first communication port and the second communication port at a first feeding point and a second feeding point, respectively, the antenna comprising:
a first connecting part including a first end and a second end, the first end of the first connecting part being electrically connected to the first feeding point,
a second connecting part including a first end and second end, the first end of the second connecting part being electrically connected to the second feeding point,
a first portion electrically connected to the second end of the first connecting part and the second end of the second connecting part,
a lumped element provided along the first portion between the second end of the first connecting part and the second end of the second connecting part,
a second portion connected to one end of the first portion and extending away from the lumped element, and
a third portion connected to another end of the first portion opposite the one end of the first portion and extending away from the lumped element,
wherein the first portion, the second portion and the third portion form a conductive pattern of the antenna.

17. The electronic device of claim 16, wherein the third portion overlaps the lumped element without the second portion overlapping the lumped element.

18. The electronic device of claim 16, wherein the length of the third portion is shorter than the length of the second portion.

* * * * *